United States Patent
Ezerzer et al.

(10) Patent No.: US 7,568,038 B1
(45) Date of Patent: Jul. 28, 2009

(54) CALL CENTERS FOR PROVIDING CUSTOMER SERVICES IN A TELECOMMUNICATIONS NETWORK

(75) Inventors: Ran Ezerzer, San Diego, CA (US); Roberto Armando Portillo Jarquin, San Diego, CA (US); Ali Aljane, San Diego, CA (US); Eli Ben Borodow, San Diego, CA (US); Gerald Augustin Holly, Jr., San Diego, CA (US); Edwin Kenneth Margulies, Las Vegas, NV (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/739,916

(22) Filed: Dec. 17, 2003

Related U.S. Application Data

(63) Continuation of application No. 09/638,274, filed on Aug. 14, 2000, now Pat. No. 6,697,858.

(51) Int. Cl.
*G06F 15/16* (2006.01)
(52) U.S. Cl. .................. 709/227; 709/224; 709/203; 713/201
(58) Field of Classification Search ............ 709/203, 709/217, 224, 226, 227, 228, 206, 245, 229, 709/220, 248; 345/744; 713/201, 161; 455/415, 455/416; 370/216, 217, 352, 231; 714/1; 379/265.01
See application file for complete search history.

(56) References Cited

U.S. PATENT DOCUMENTS

| | | | |
|---|---|---|---|
| 5,479,487 A | 12/1995 | Hammond | |
| 5,706,507 A | 1/1998 | Schloss | |
| 5,774,660 A * | 6/1998 | Brendel et al. ............. 709/201 |
| 5,774,670 A * | 6/1998 | Montulli .................... 709/227 |
| 5,790,650 A * | 8/1998 | Dunn et al. ............ 379/265.03 |
| 5,822,306 A | 10/1998 | Catchpole | |
| 5,895,471 A * | 4/1999 | King et al. ................ 707/104.1 |
| 5,903,641 A | 5/1999 | Tonisson | |
| 5,914,713 A * | 6/1999 | Nario et al. ................. 345/744 |
| 5,978,465 A * | 11/1999 | Corduroy et al. ........ 379/265.02 |
| 5,982,873 A | 11/1999 | Flockhart et al. | |
| 6,012,088 A | 1/2000 | Li et al. | |
| 6,014,688 A | 1/2000 | Venkatraman et al. | |
| 6,029,141 A | 2/2000 | Bezos et al. | |
| 6,046,762 A | 4/2000 | Sonesh et al. | |
| 6,070,242 A * | 5/2000 | Wong et al. ................. 713/201 |
| 6,073,178 A * | 6/2000 | Wong et al. ................. 709/229 |
| 6,163,607 A | 12/2000 | Bogart et al. | |
| 6,173,053 B1 | 1/2001 | Bogart et al. | |

(Continued)

*Primary Examiner*—Khanh Q Dinh
(74) *Attorney, Agent, or Firm*—Townsend and Townsend and Crew LLP

(57) ABSTRACT

A software-based distributed architecture allows rapid provisioning and flexible management of fault-tolerant call centers for interaction between companies' agents and outside customers via multi-media messages, using both real time and non-real time messages. The real time messages include web-based chat, forms and applications sharing, PSTN calls, and incoming and outgoing Voice over IP calls. The non-real time messages include web call-back requests, voice messages, fax messages, and email messages. The architecture provides for sharing of non-dedicated resources among multiple companies, mirrored hot backup, dynamic resource provisioning and allocation, dynamic load balancing, and implementation of service controls on individual companies in accordance with subscription service limits.

11 Claims, 34 Drawing Sheets

U.S. PATENT DOCUMENTS

| | | | |
|---|---|---|---|
| 6,173,312 B1 * | 1/2001 | Atarashi et al. | 709/203 |
| 6,185,288 B1 * | 2/2001 | Wong | 379/219 |
| 6,226,748 B1 | 5/2001 | Bots et al. | |
| 6,229,888 B1 * | 5/2001 | Miloslavsky | 379/265.01 |
| 6,230,197 B1 | 5/2001 | Beck et al. | |
| 6,259,909 B1 | 7/2001 | Ratayczak et al. | |
| 6,263,066 B1 | 7/2001 | Shtivelman et al. | |
| 6,298,045 B1 * | 10/2001 | Pang et al. | 370/261 |
| 6,424,624 B1 | 7/2002 | Galand et al. | |
| 6,496,867 B1 * | 12/2002 | Beser et al. | 709/245 |
| 6,574,331 B1 * | 6/2003 | Forsythe et al. | 379/265.01 |
| 6,618,710 B1 * | 9/2003 | Zondervan et al. | 706/11 |
| 6,625,141 B1 * | 9/2003 | Glitho et al. | 370/352 |
| 6,665,395 B1 * | 12/2003 | Busey et al. | 379/265.09 |
| 6,674,713 B1 * | 1/2004 | Berg et al. | 370/217 |
| 6,697,858 B1 * | 2/2004 | Ezerzer et al. | 709/224 |
| 6,718,366 B2 * | 4/2004 | Beck et al. | 709/204 |
| 6,732,178 B1 * | 5/2004 | Van Horne et al. | 709/227 |
| 6,760,324 B1 * | 7/2004 | Scott et al. | 370/352 |
| 6,779,020 B1 * | 8/2004 | Henrick | 709/206 |
| 6,798,768 B1 * | 9/2004 | Gallick et al. | 370/352 |
| 6,895,558 B1 * | 5/2005 | Loveland | 715/746 |
| 6,910,074 B1 * | 6/2005 | Amin et al. | 709/227 |

* cited by examiner

Fig. 1 - Call Center (P) "10" In Telephone, Mobil or Internet-Type Network-Level Deployment
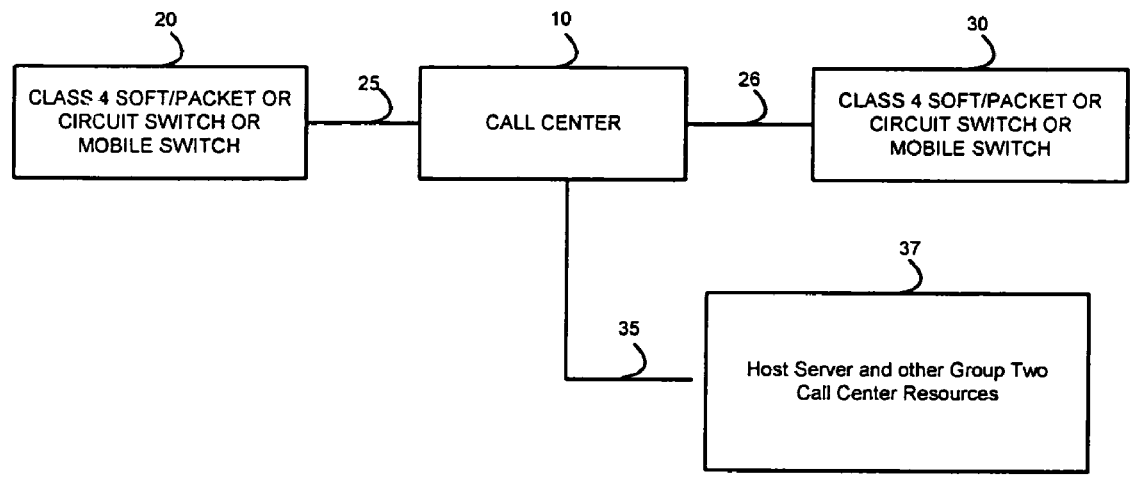

Fig. 2 - Call Center (P) "40" In Customer Premises Equipment Enterprise-Level Deployment
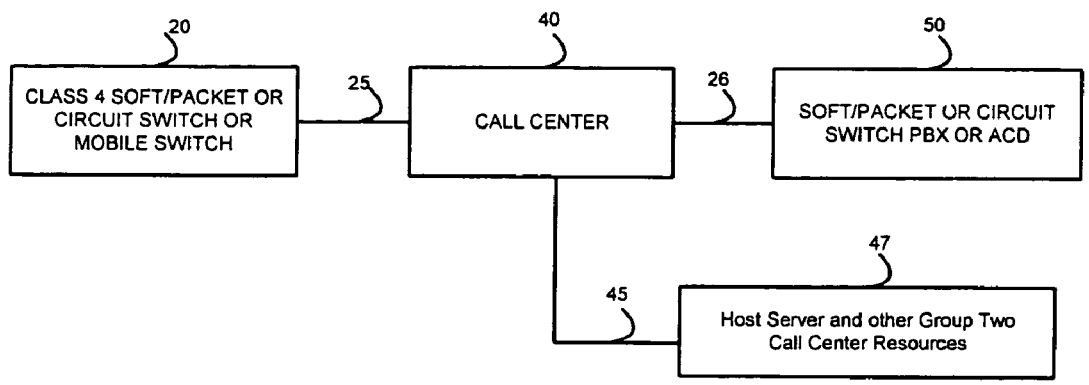

Fig. 3 - Call Center (P) "100" Architecture
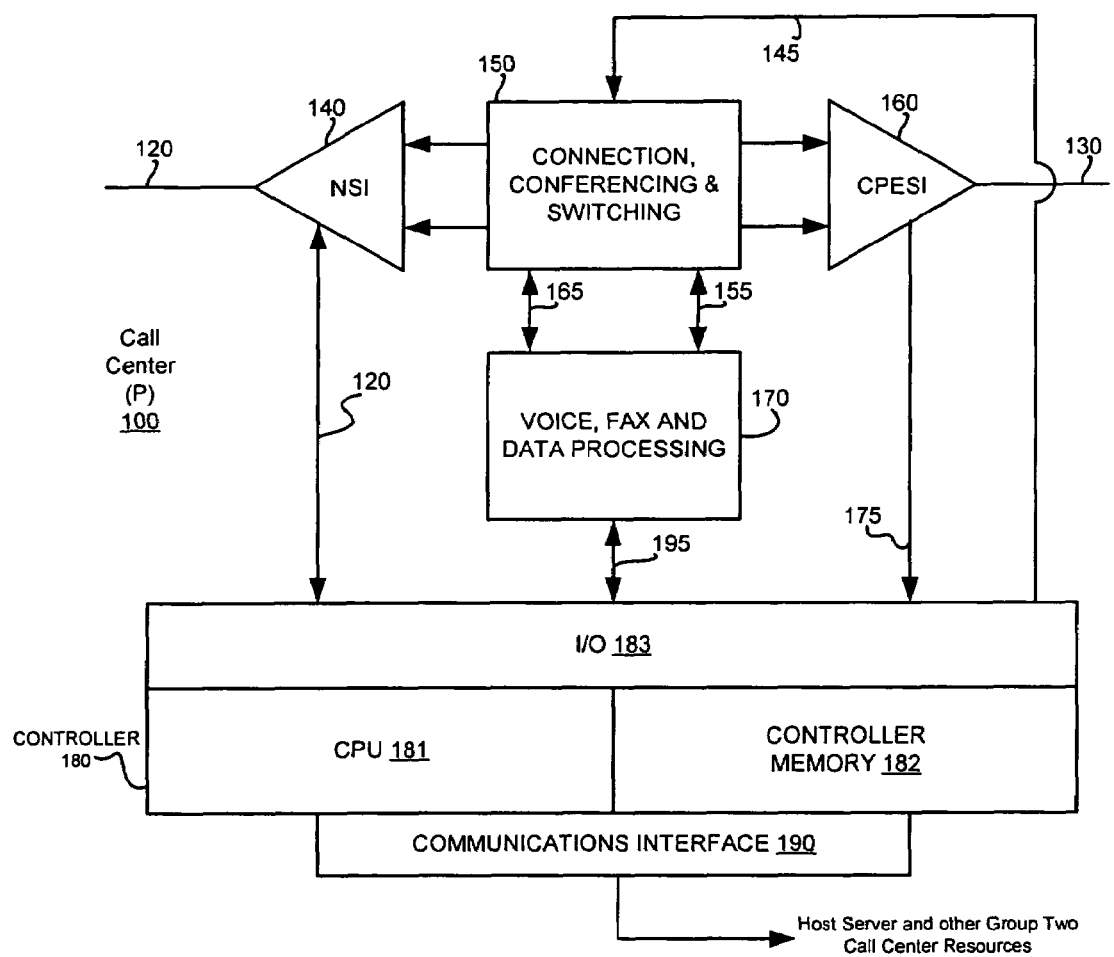

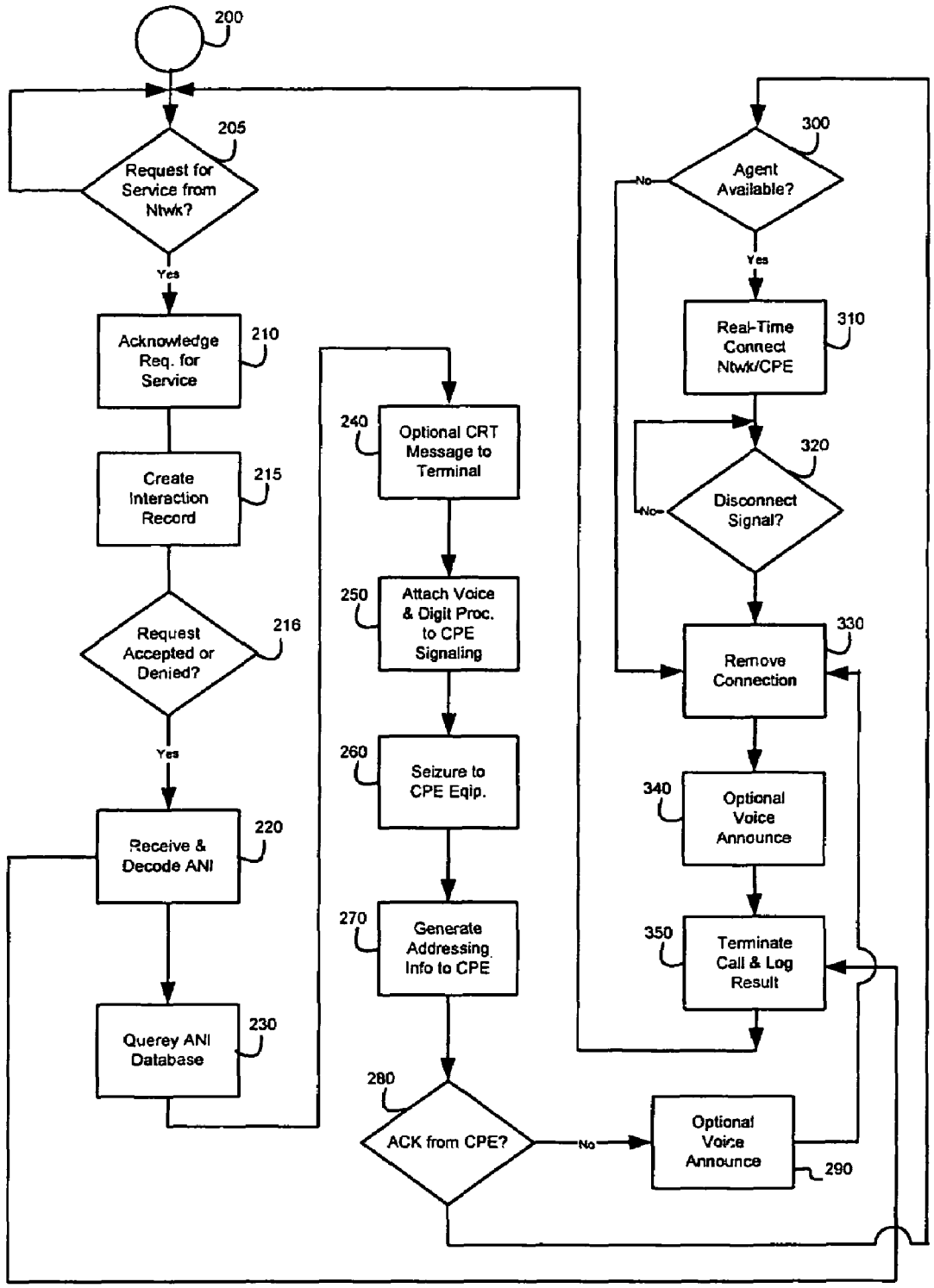

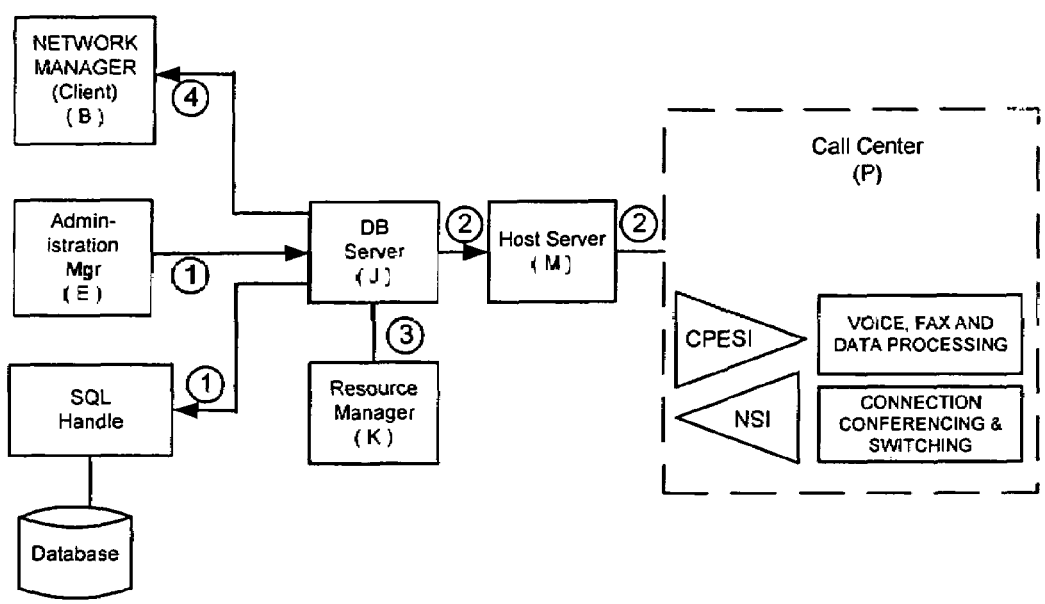
Fig. 5 - Real-Time Network Updates of Hardware Using Administration Manager Fig. 6 - Startup and Real-Time Registration of New Hardware Configuration
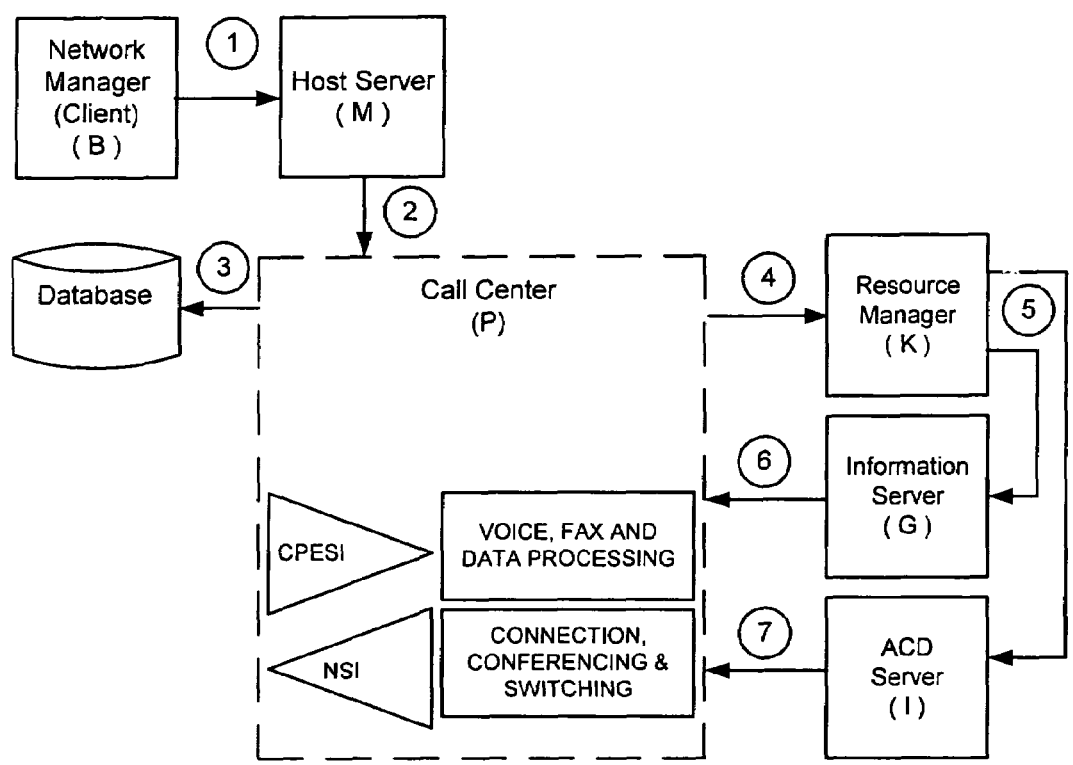

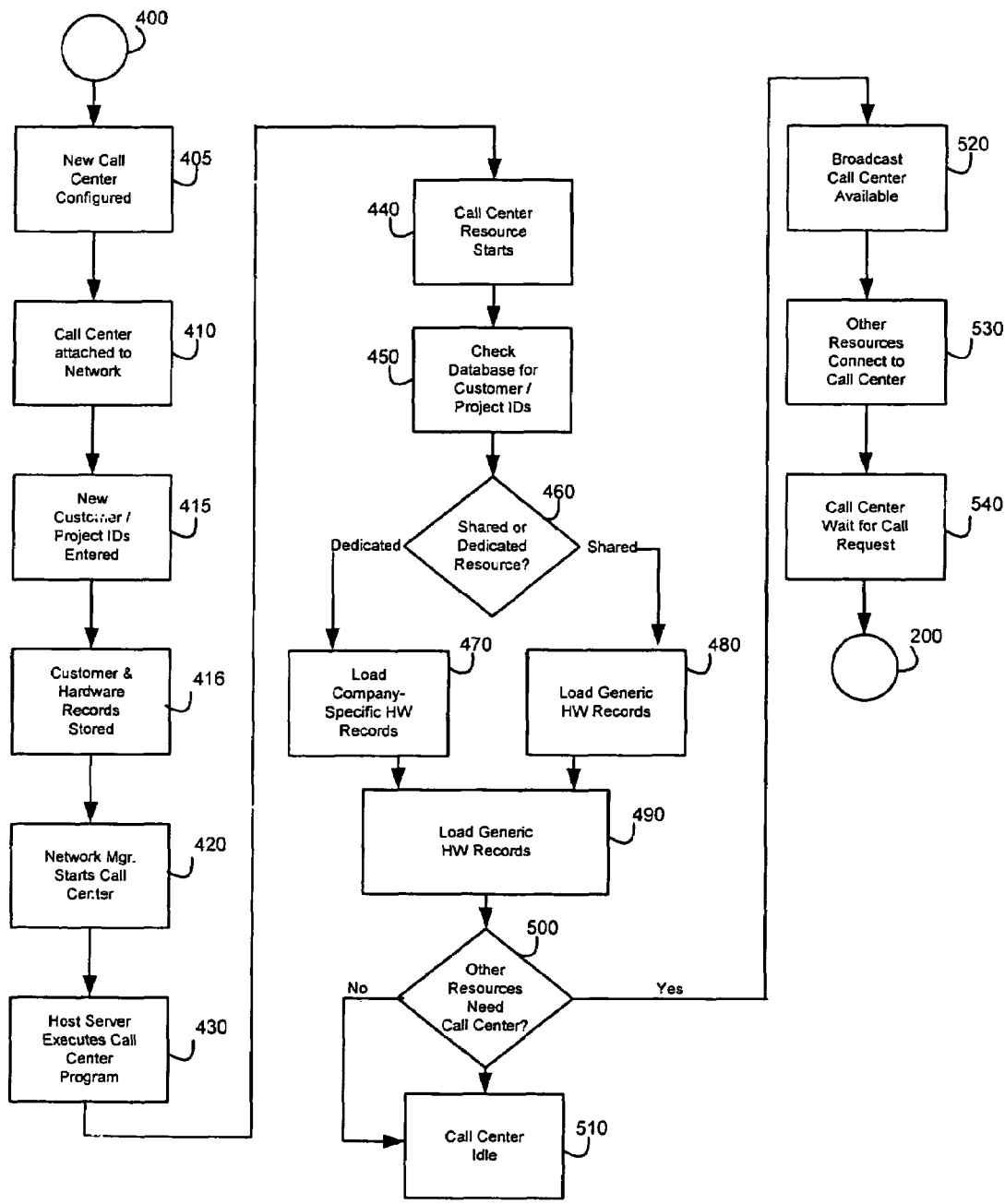
Fig. 7 - Shared and Dedicated Resource Registration

Figure 8. Call Center Multimedia Network Overview
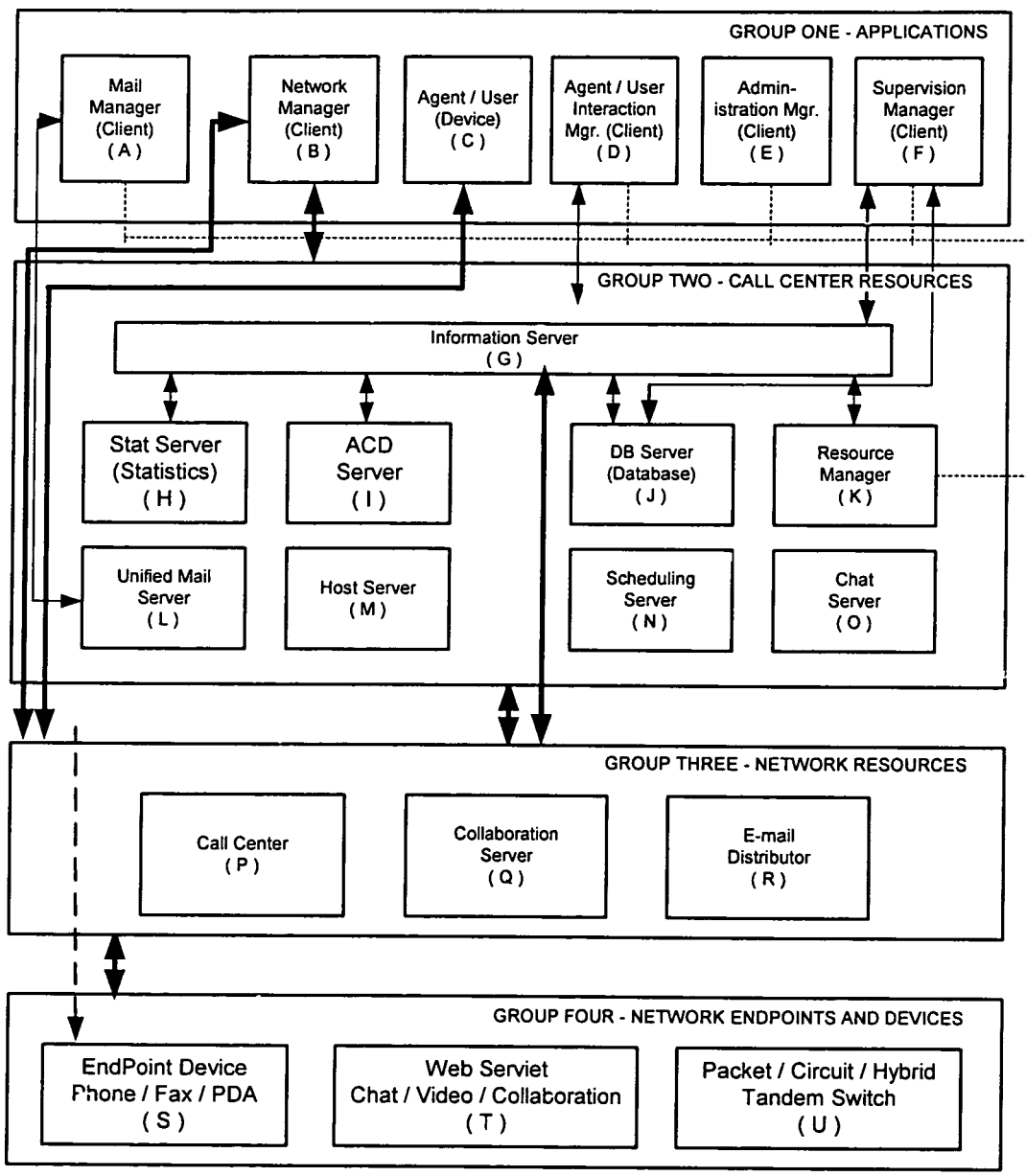

Fig. 9 - Architectural Overview of Network Manager
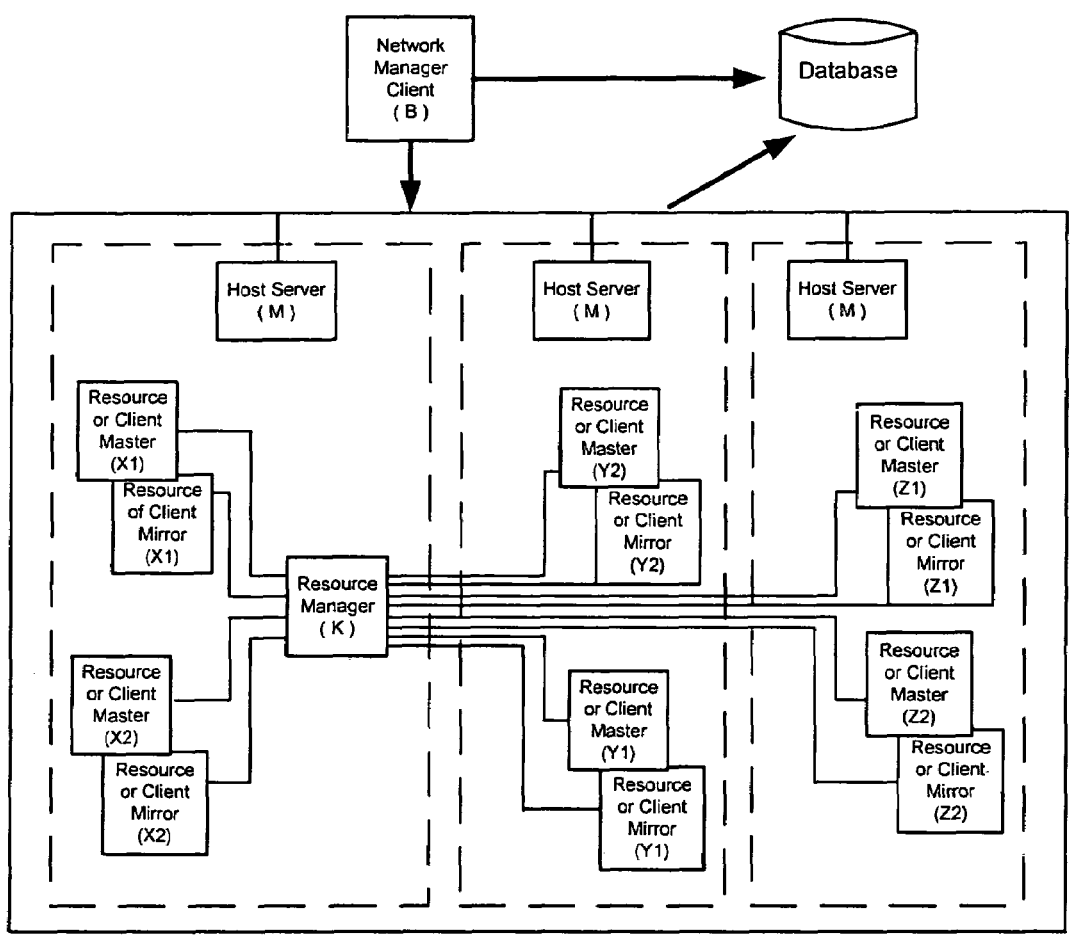

Fig. 10 - STARTING THE NETWORK MANAGER TO GET
NETWORK CHARACTERISTICS AND STATUS
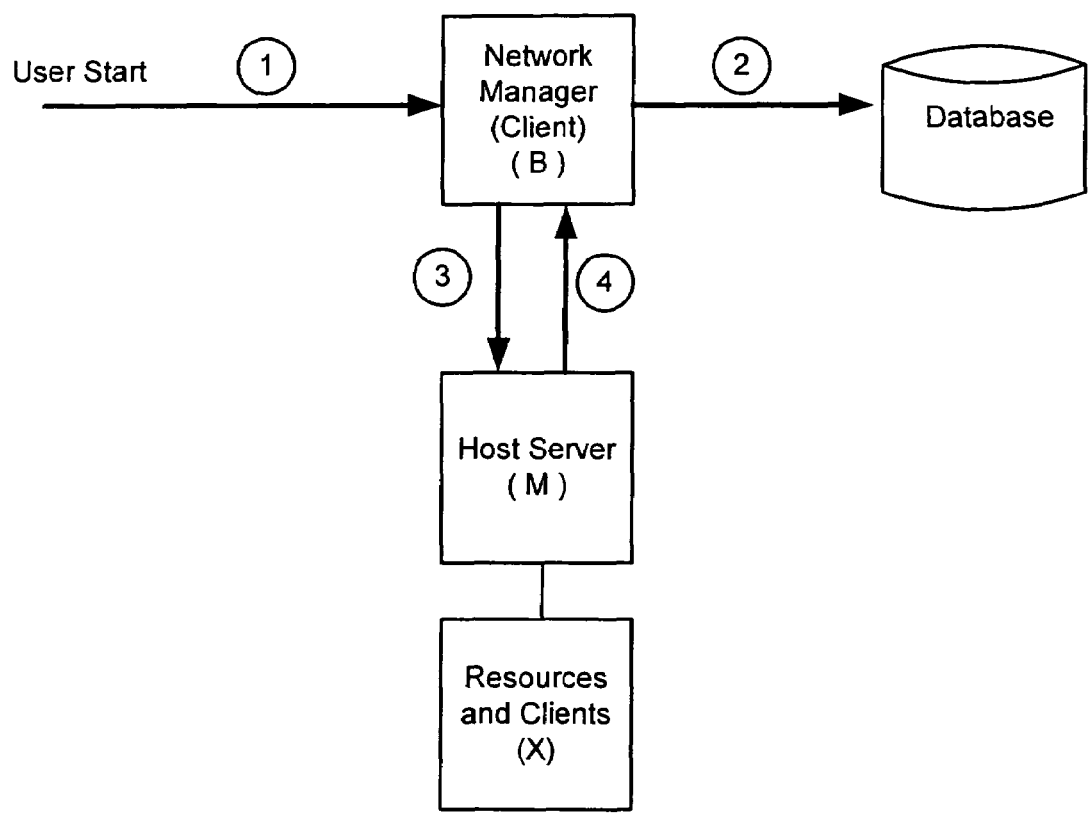

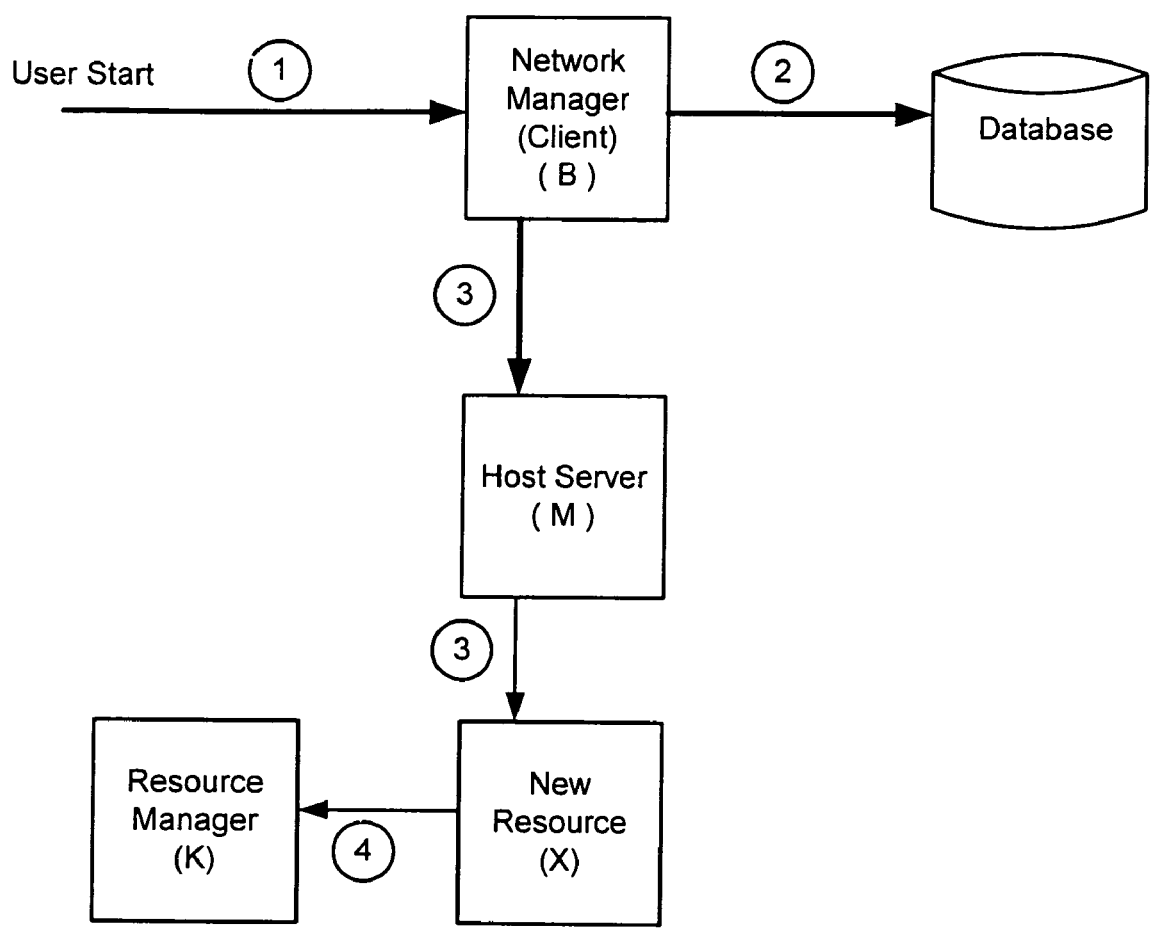
Fig. 11 - Adding a New Resource Dynamically using the Network Manager Fig. 12 - Stopping a Resource using the Network Manager
(No Service Disruption)
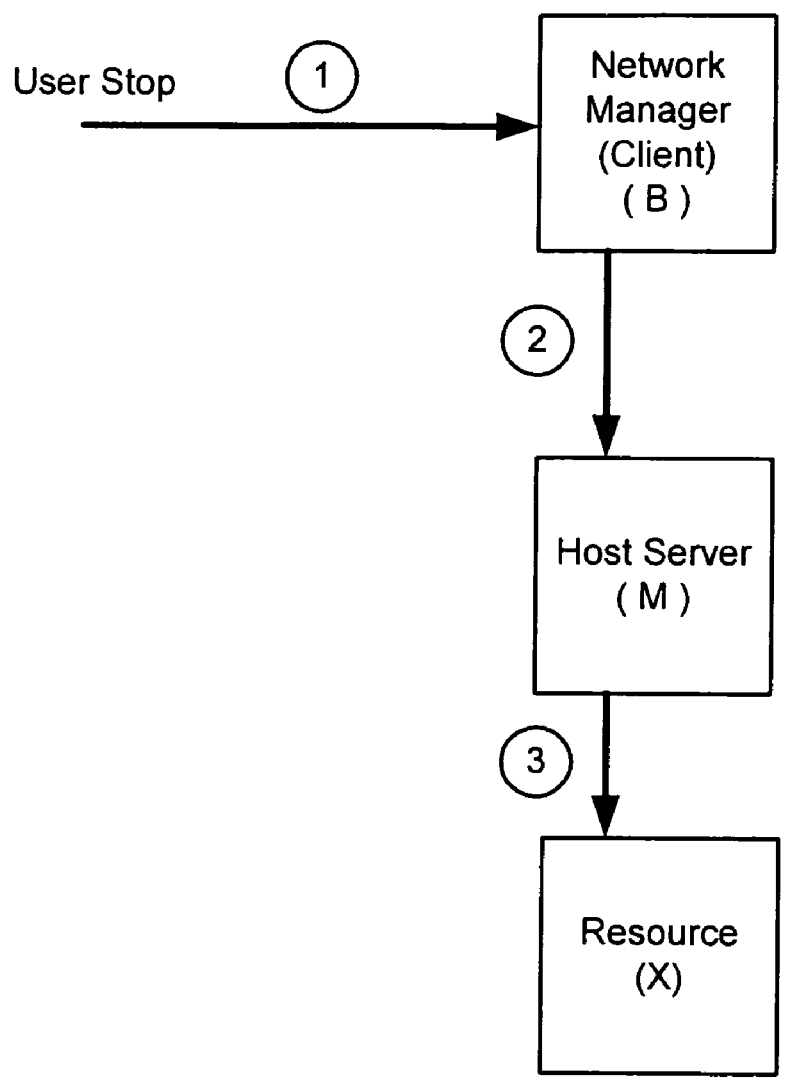

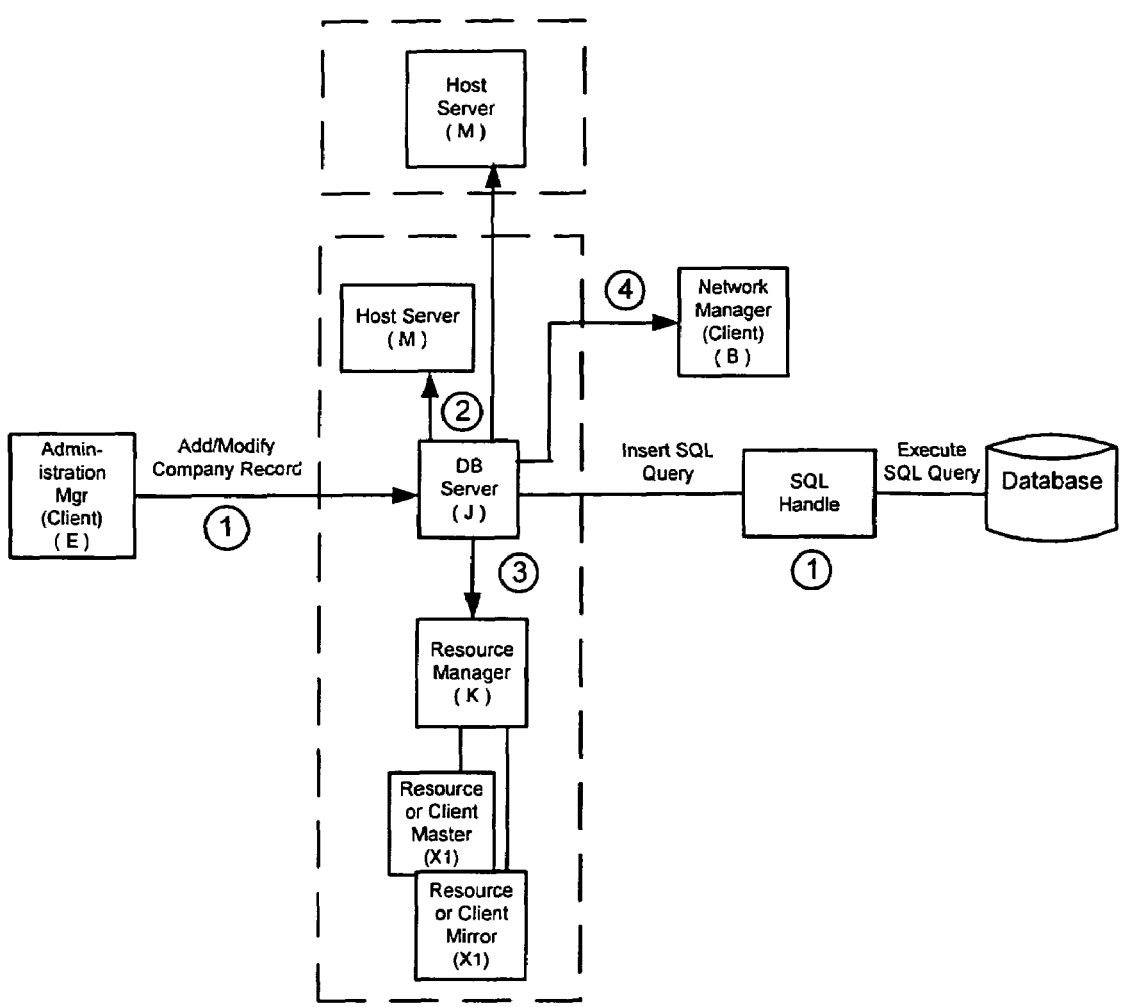
Fig. 13 - Real-Time Network Updates of Customer Records Using Network Manager Fig. 14 - Starting a New Resource Dynamically
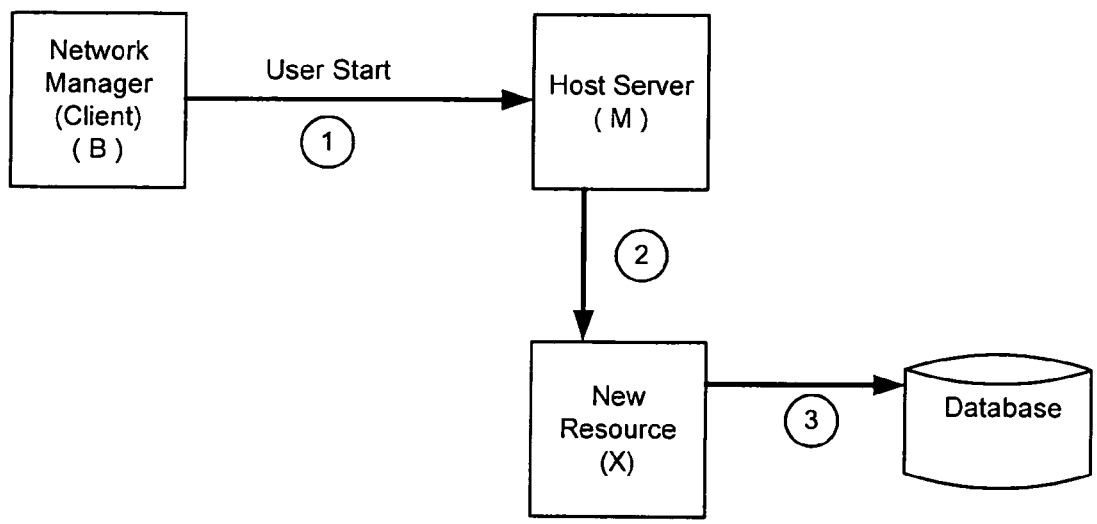

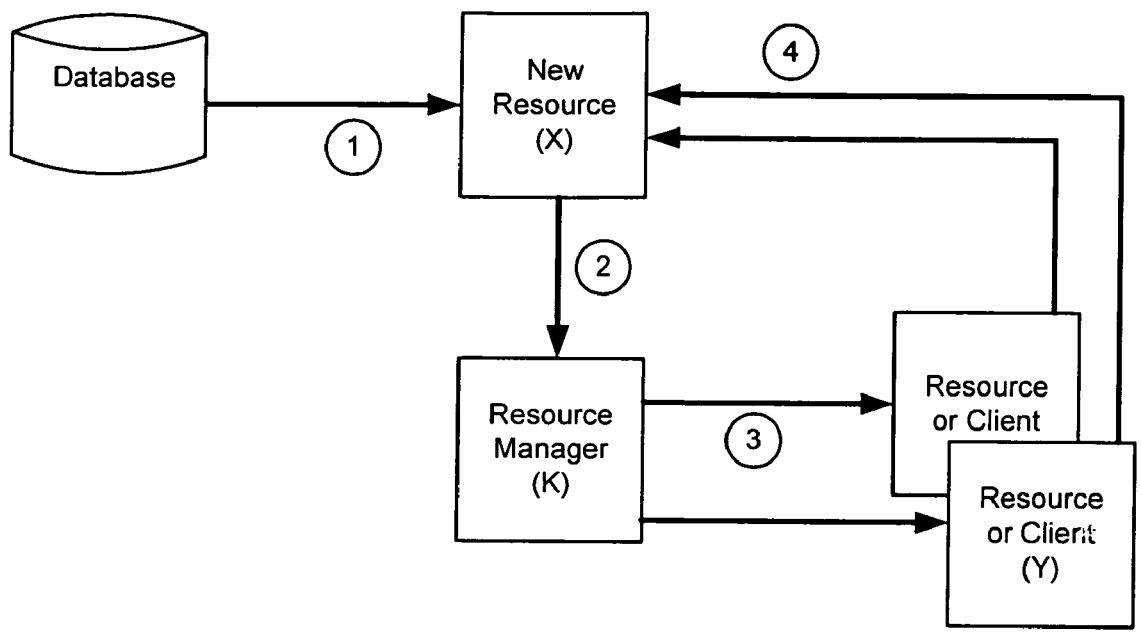
Fig. 15 - Automatic Registration of New Resource

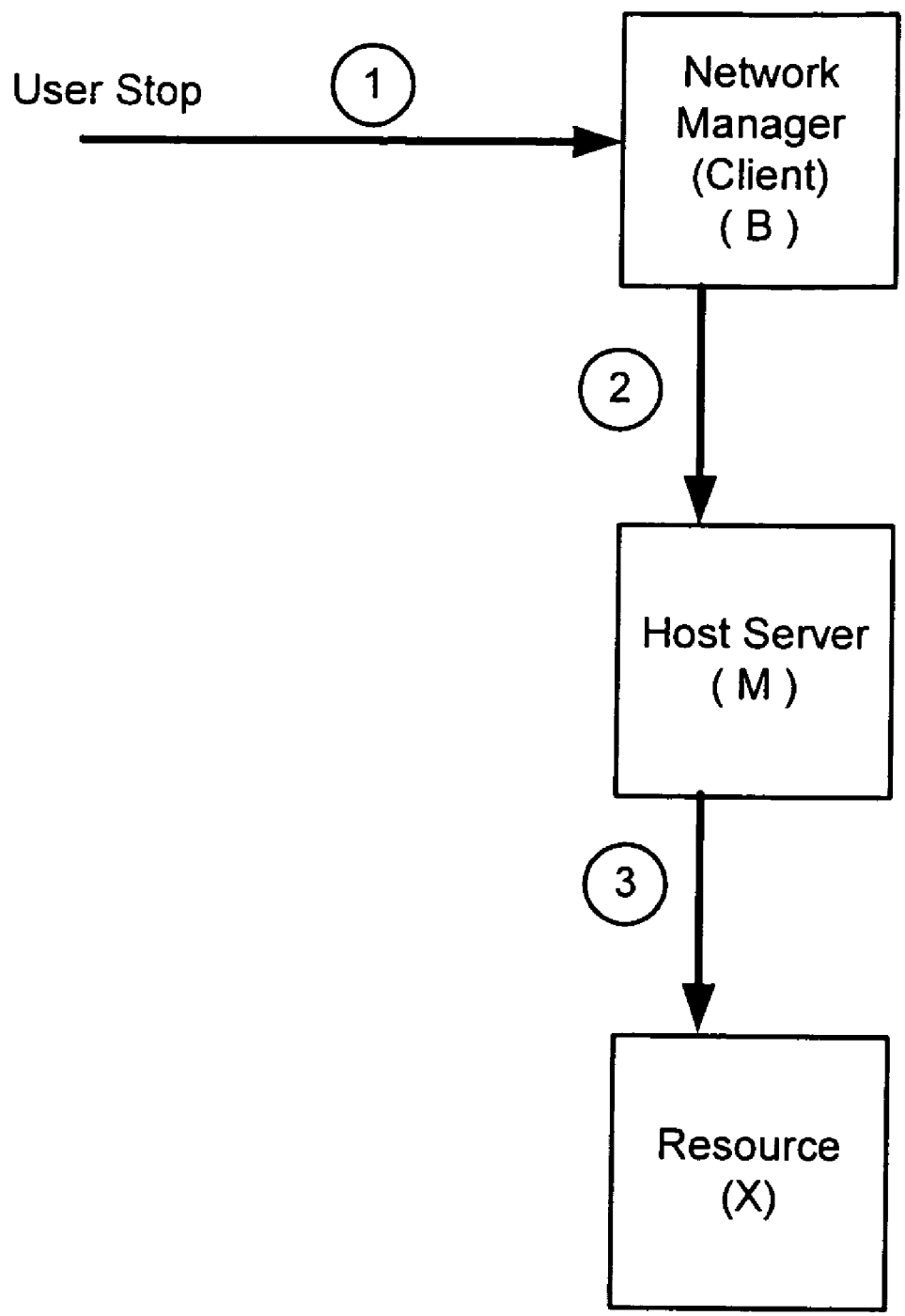
Fig. 16 - Stopping a Resource Dynamically

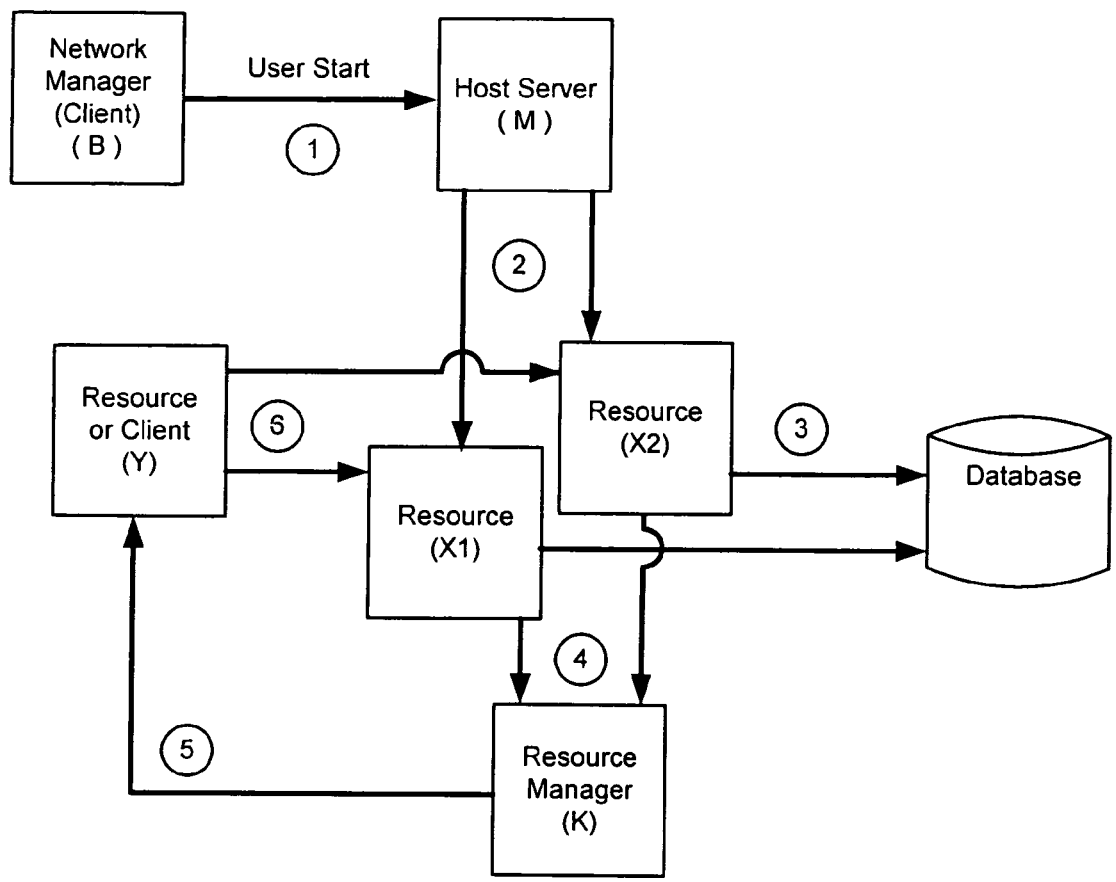
Fig. 17 - Starting and Registering Resources Dynamically
(One Shared Resource Available)

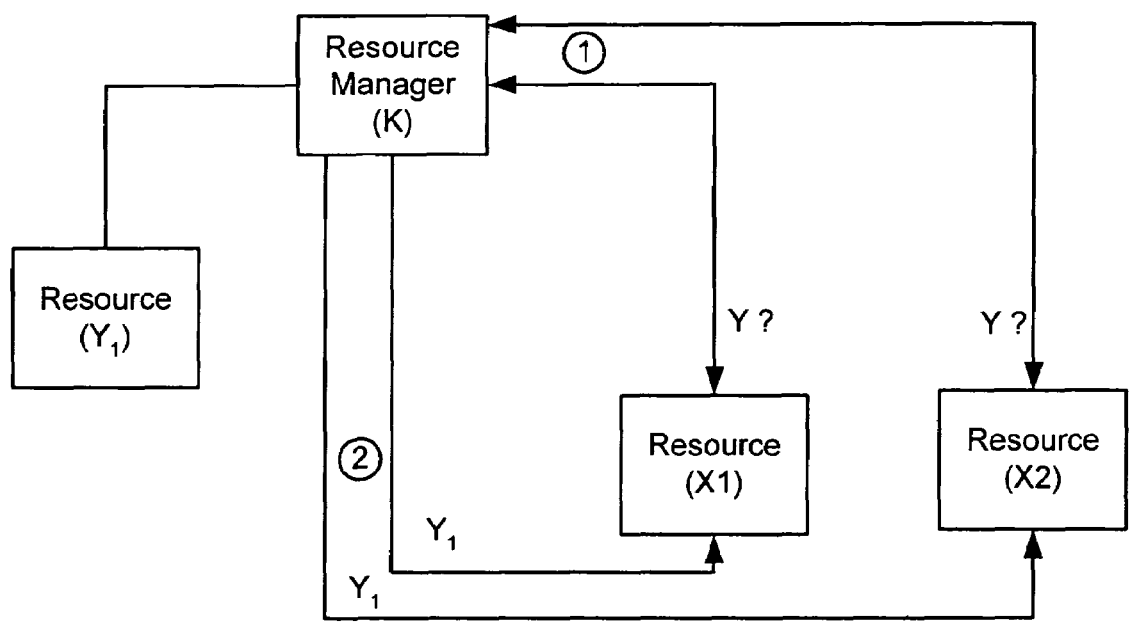
Fig. 18 - Requesting a Specific Resource Type
(One Shared Resource Available)

Fig. 19 - Connecting to and Sharing a Requested Resource
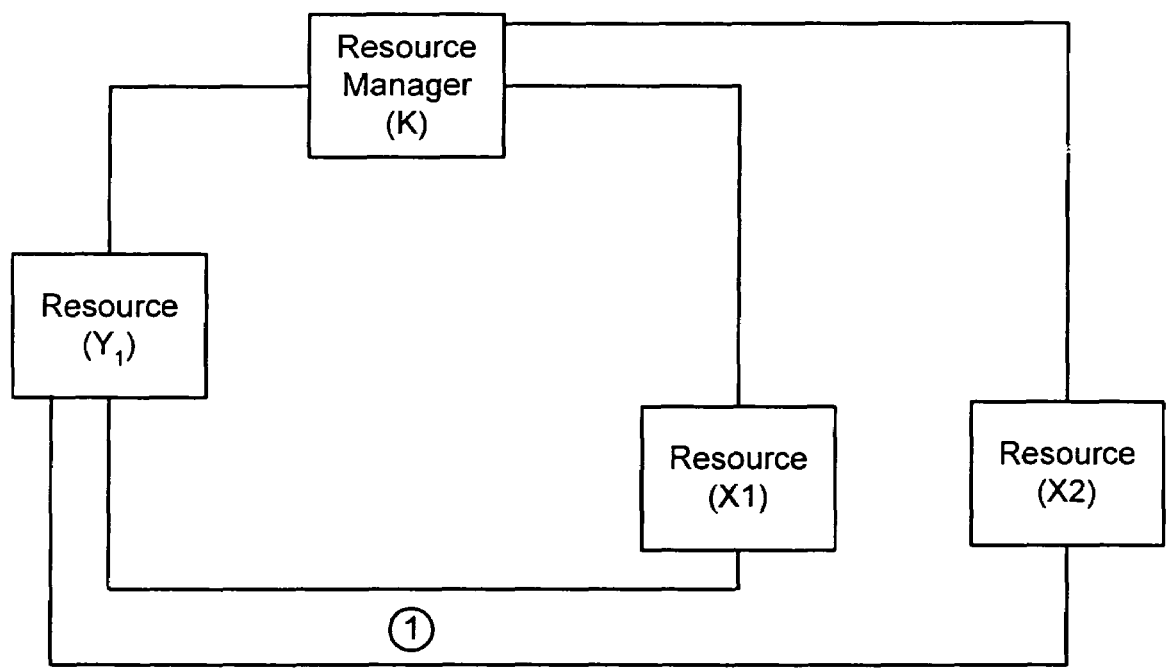

Fig. 20 - Starting and Registering Resources Dynamically
(Multiple Resources Available)
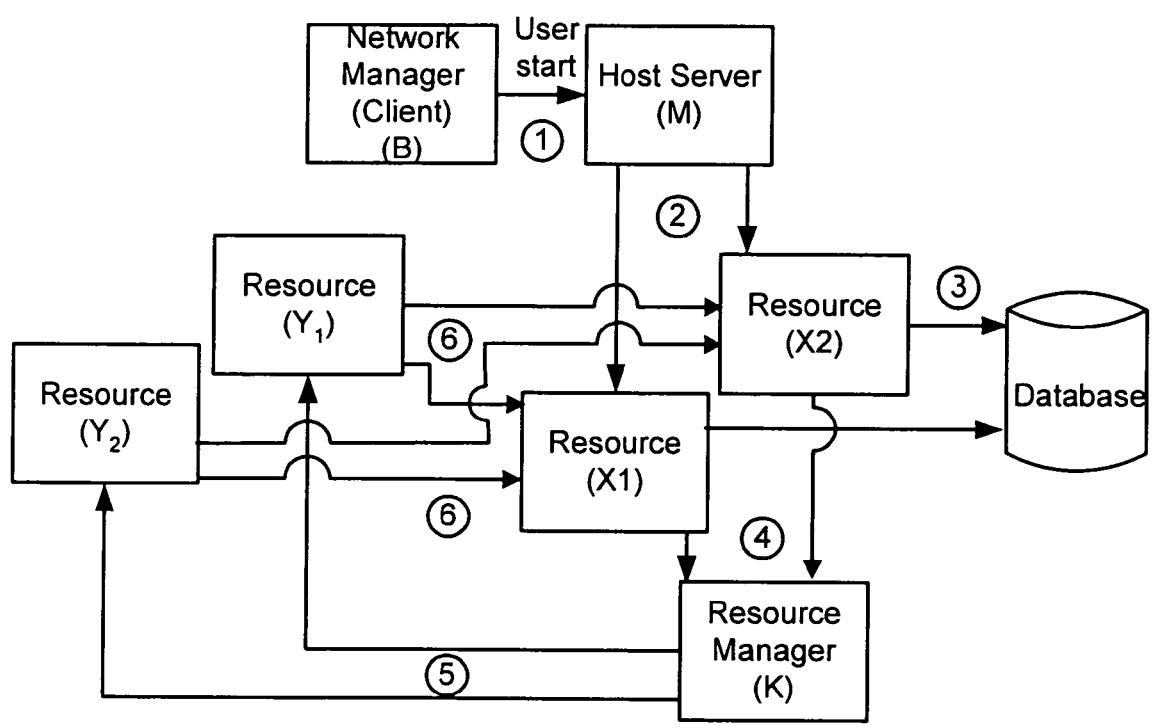

Fig. 21 - Requesting a Specific Resource Type
(Multiple Resources and Load Balancing)
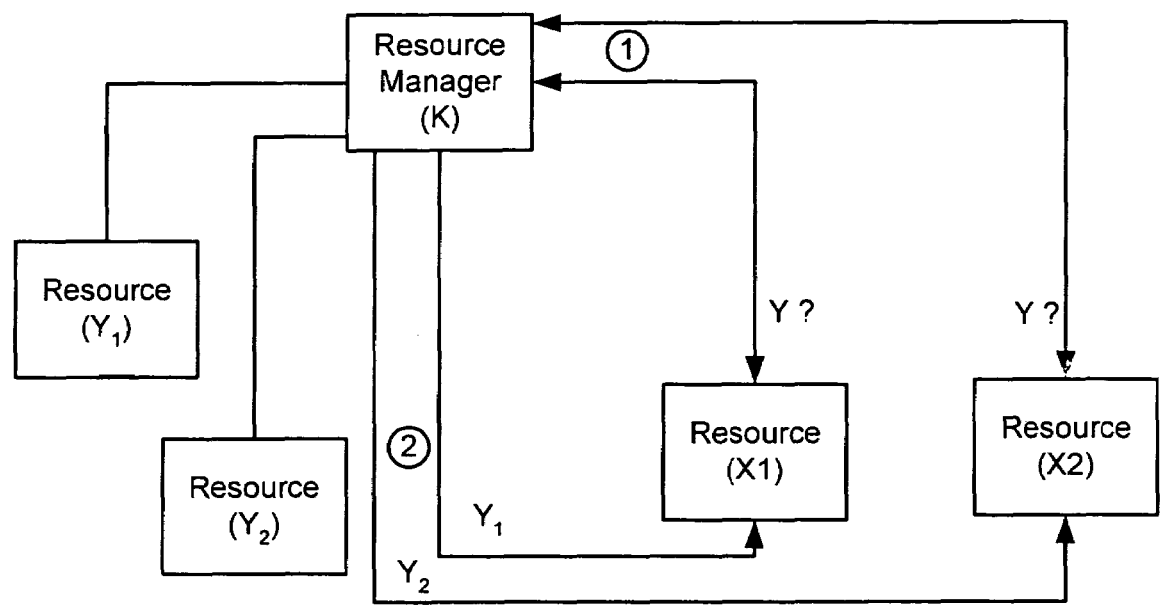

Fig. 22 - Load Balancing Between Requested Resources
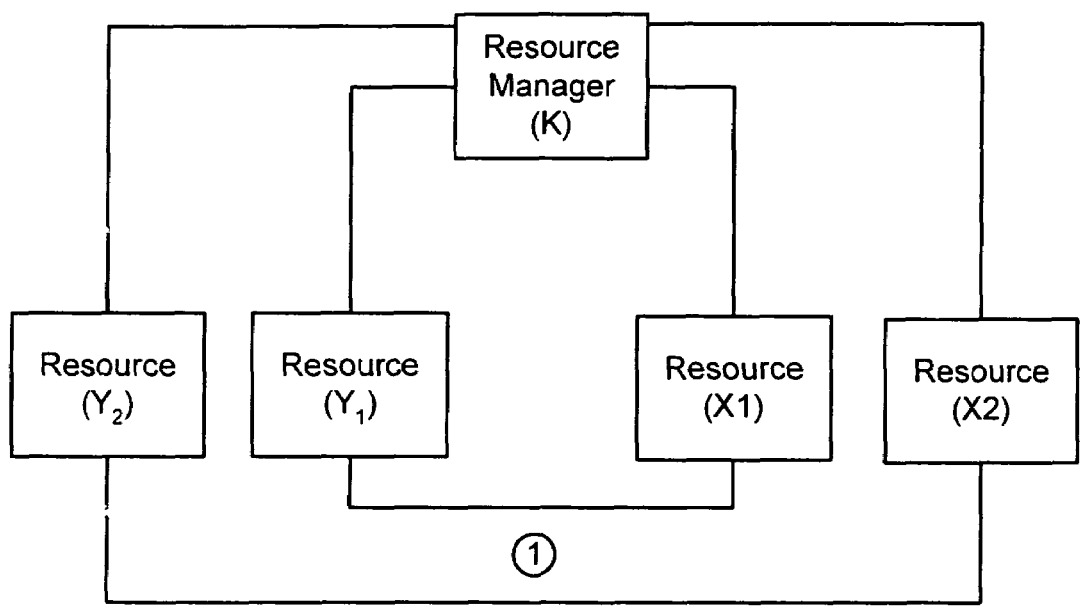

Fig. 23 - Starting Mirrored Resources
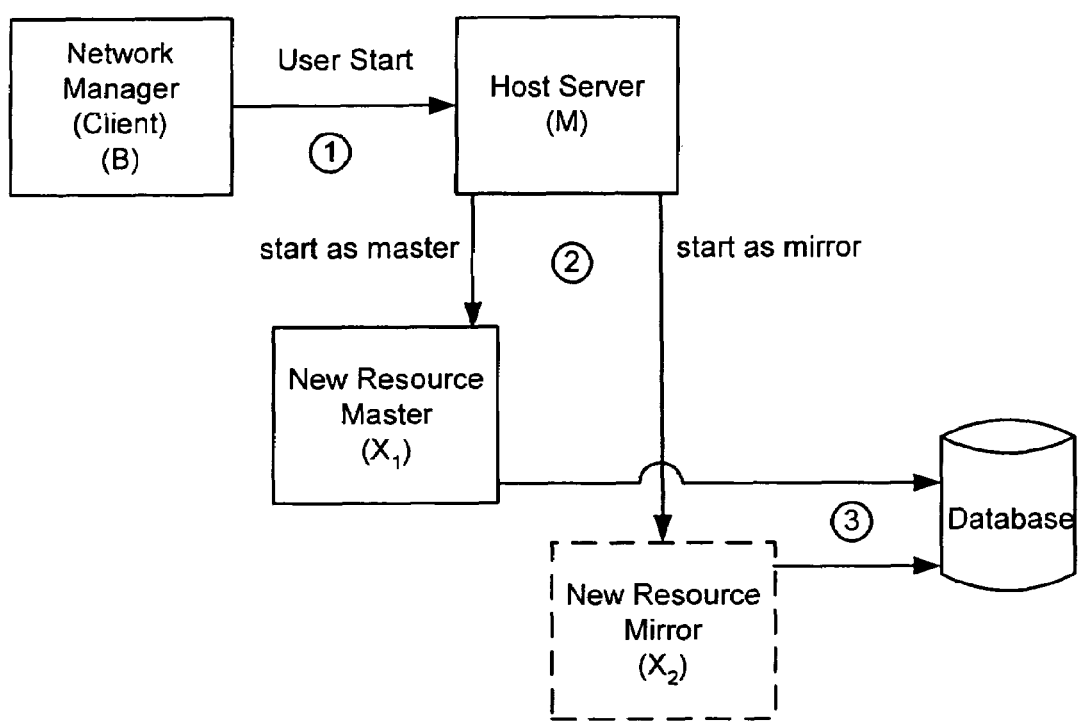

Fig. 24 - Automatic Registration of Mirrored Resources
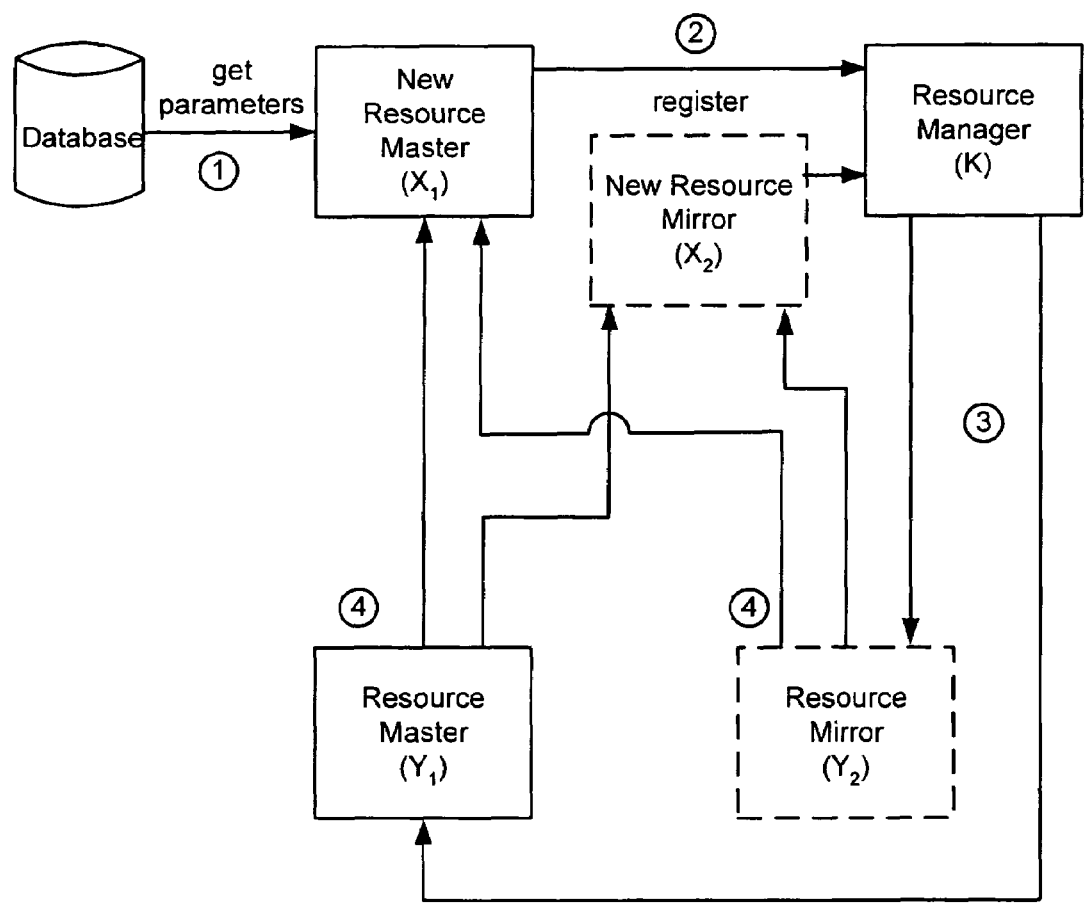

Fig. 25 - Mirrored Resource Communication with other Resources
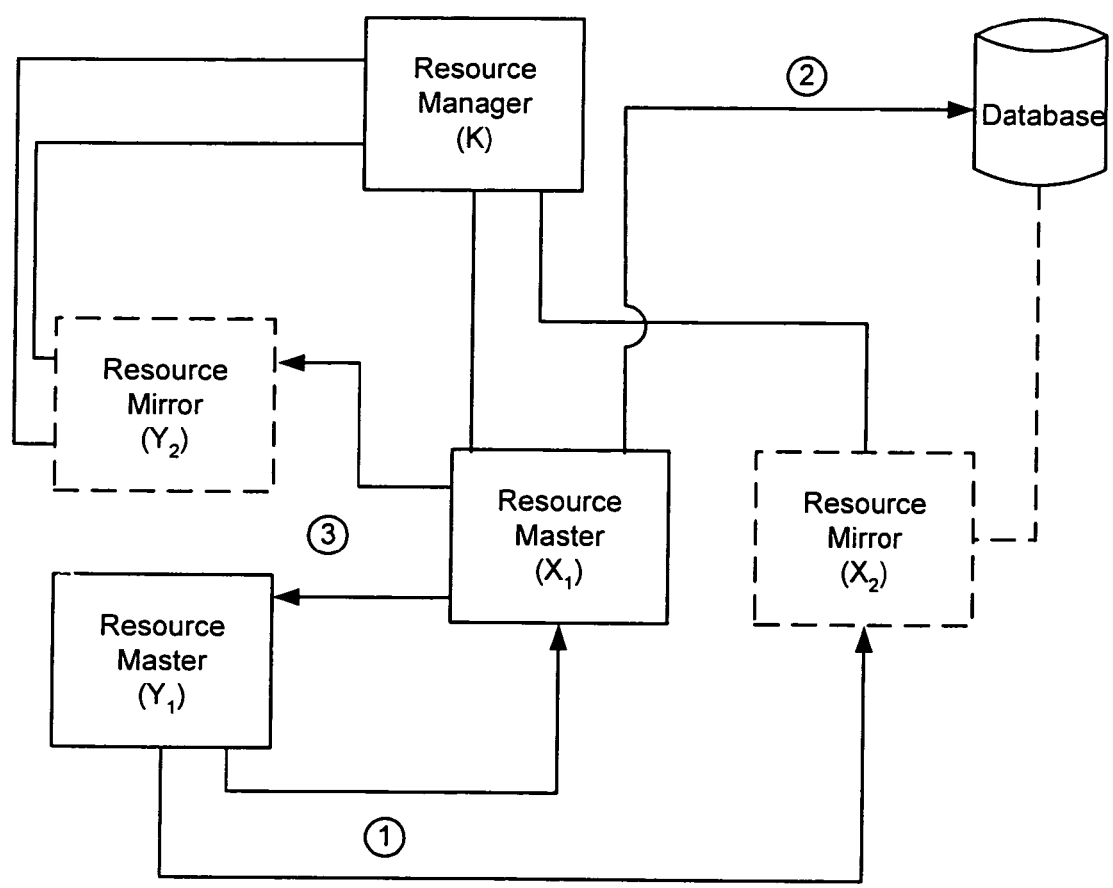

Fig. 26 - Mirrored Resource Abnormal Shutdown (PART 1)
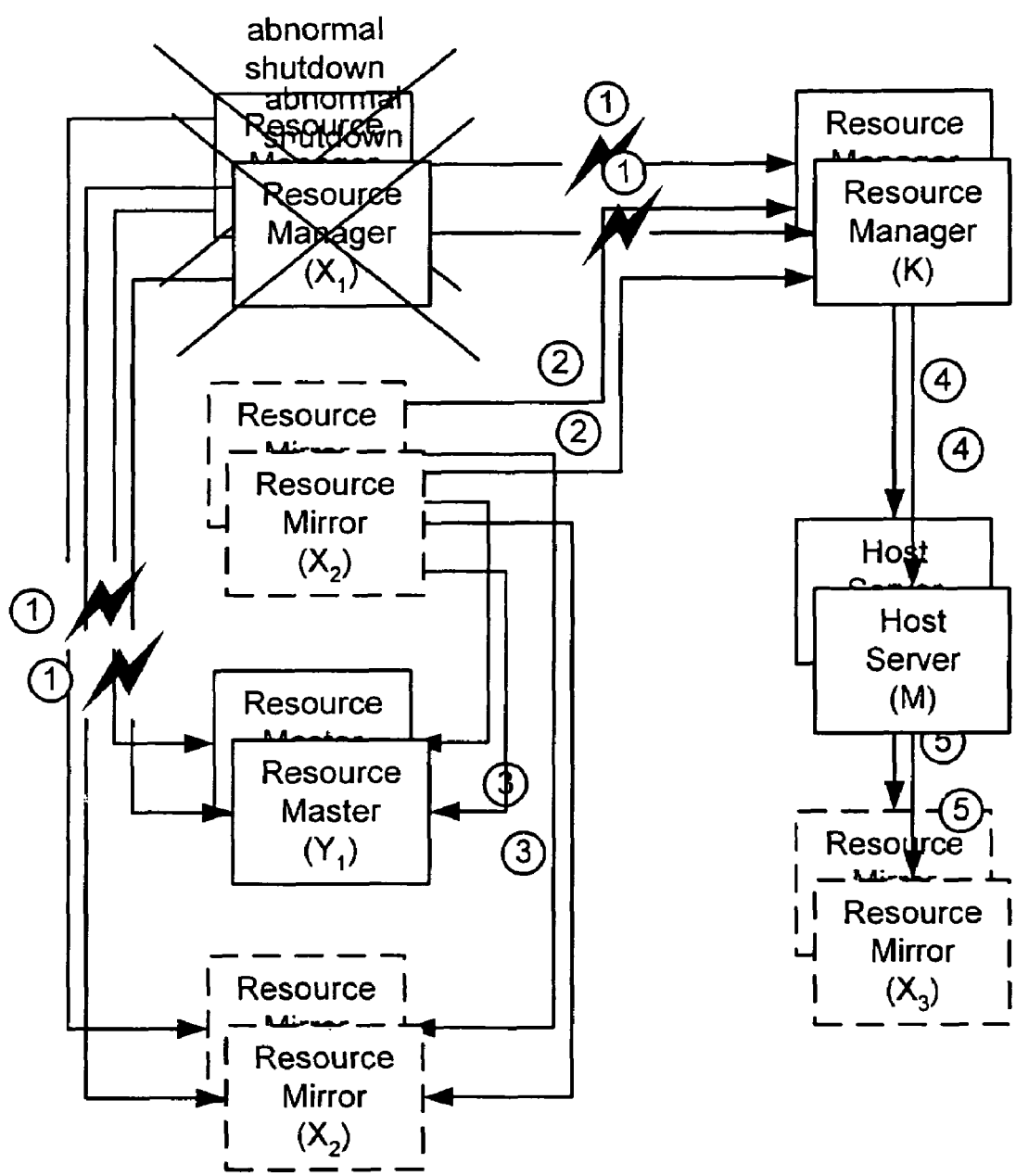

Fig. 27 - Mirrored Resource Abnormal Shutdown (PART 2)
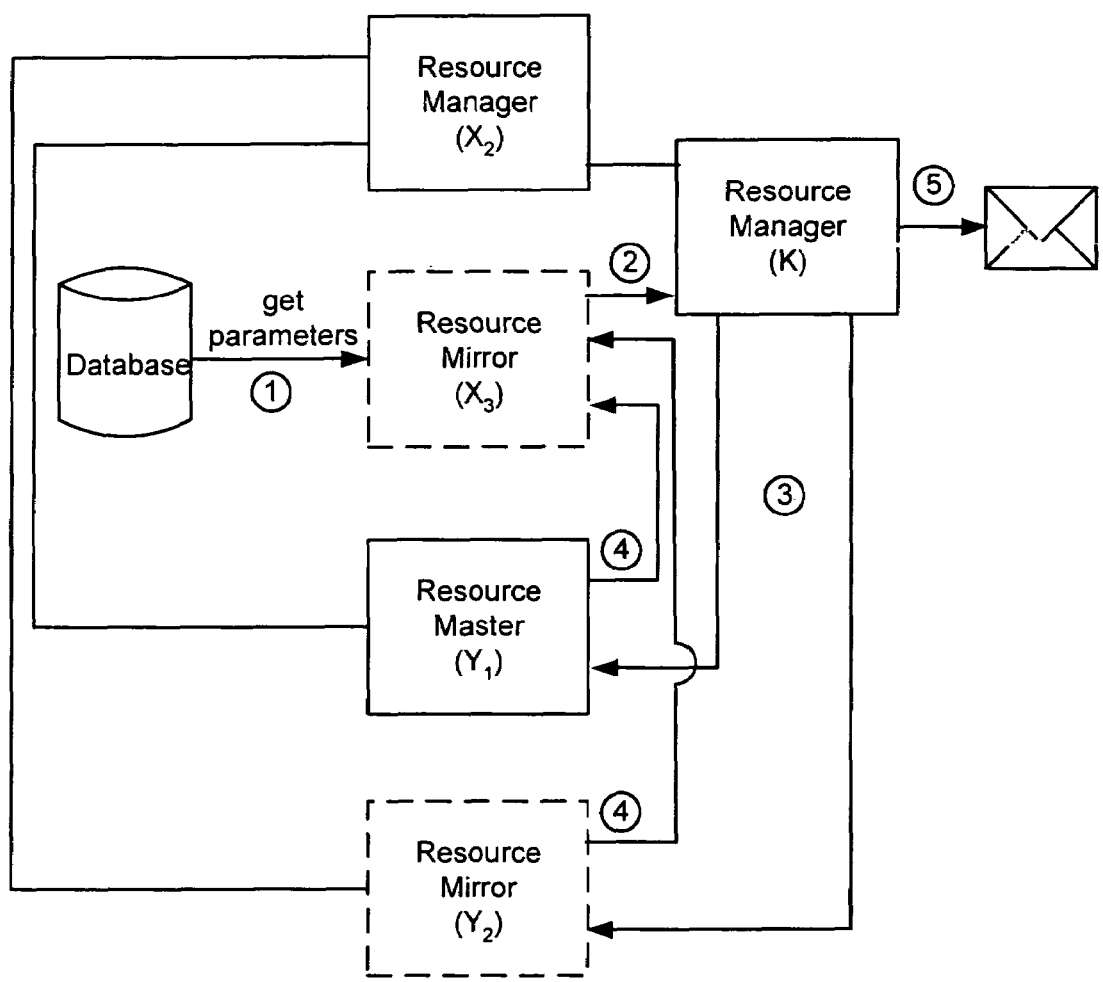

Fig. 28 - Shared and Dedicated Resource Registration
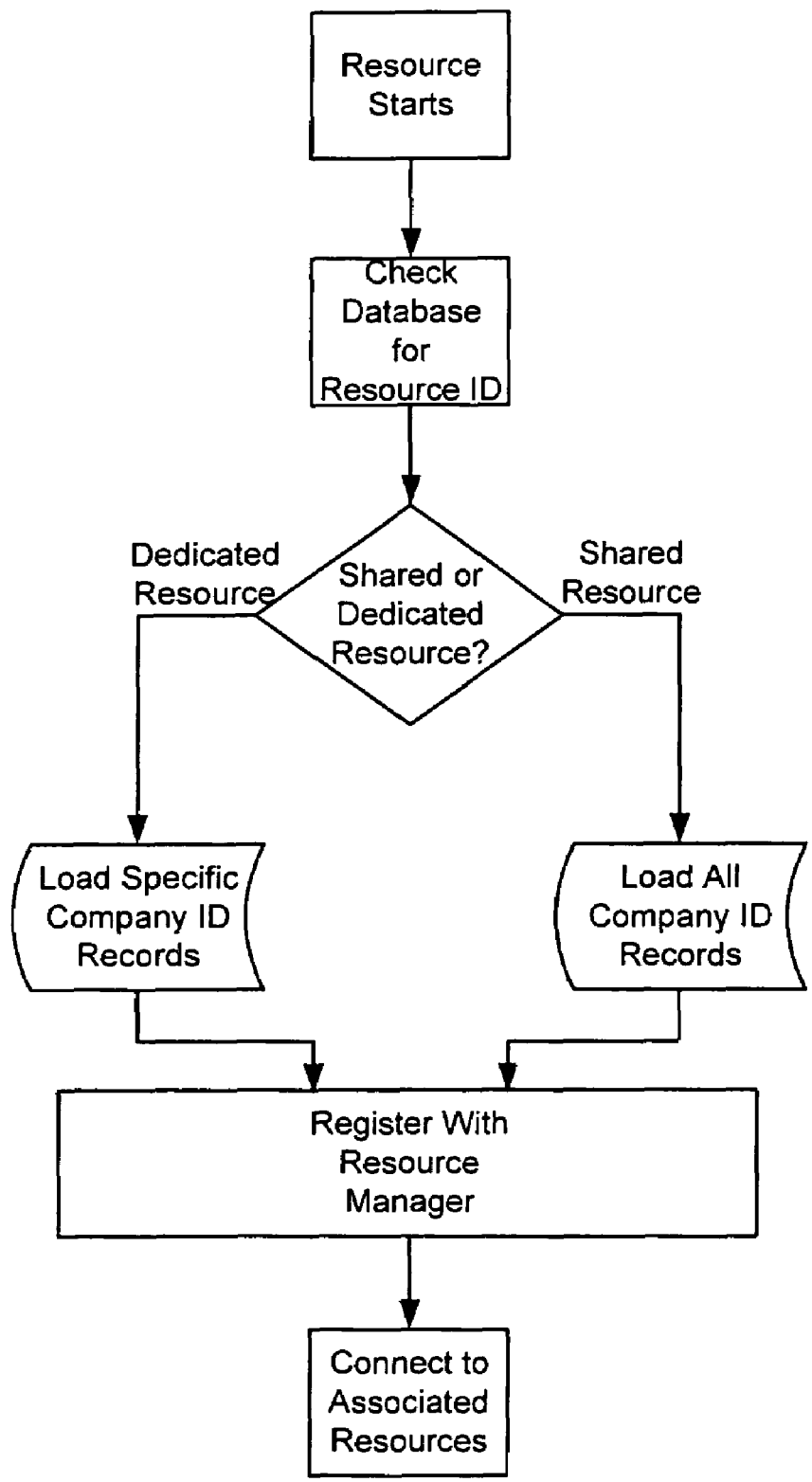

Fig. 29 - Connection to a Shared Resource
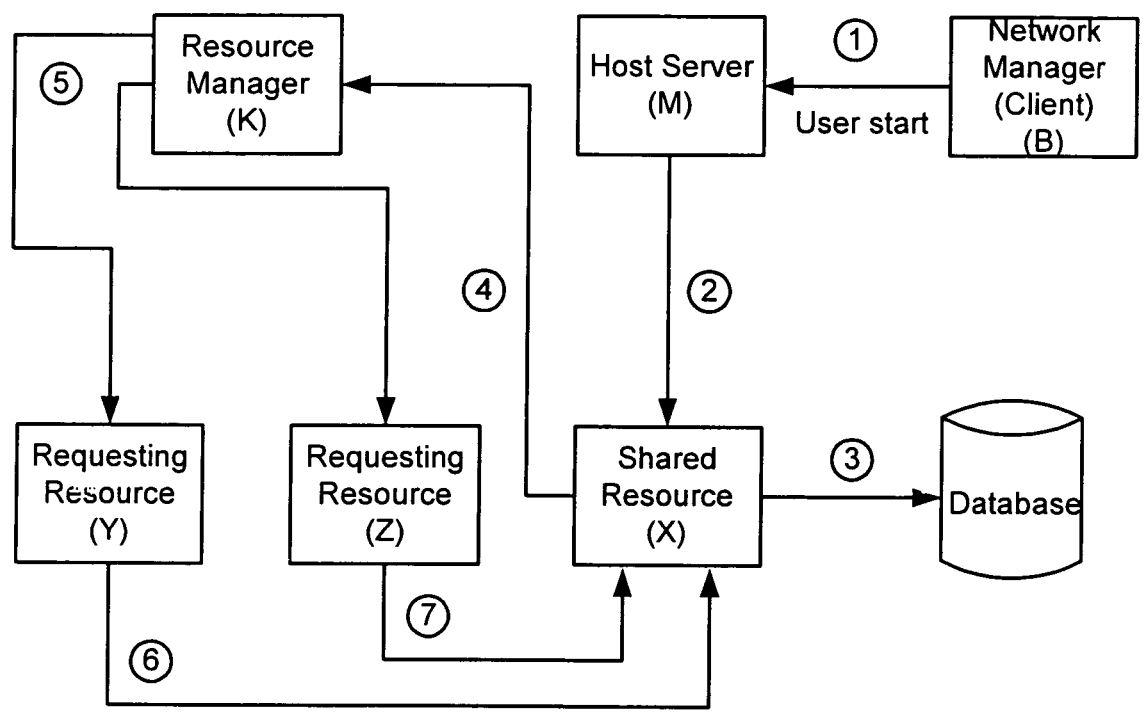

Fig. 30 - Handling Requests to a Shared Resource
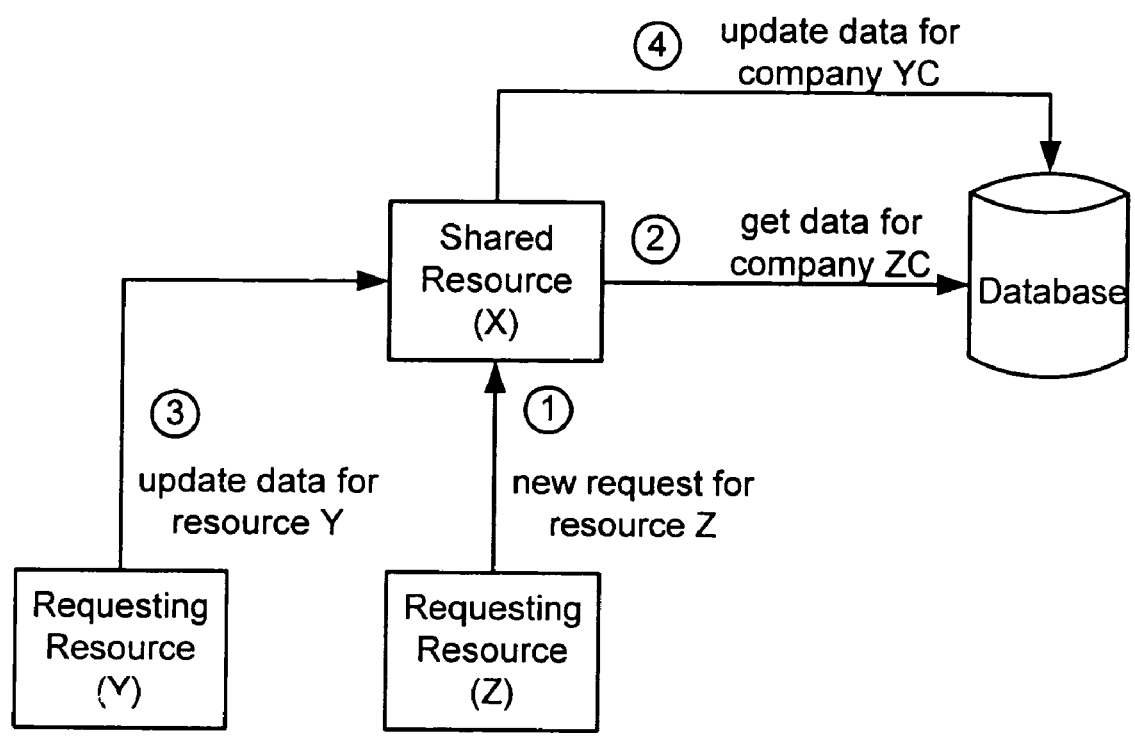

Fig. 31 - Example Requests to Stat Server to Create Interaction Histories
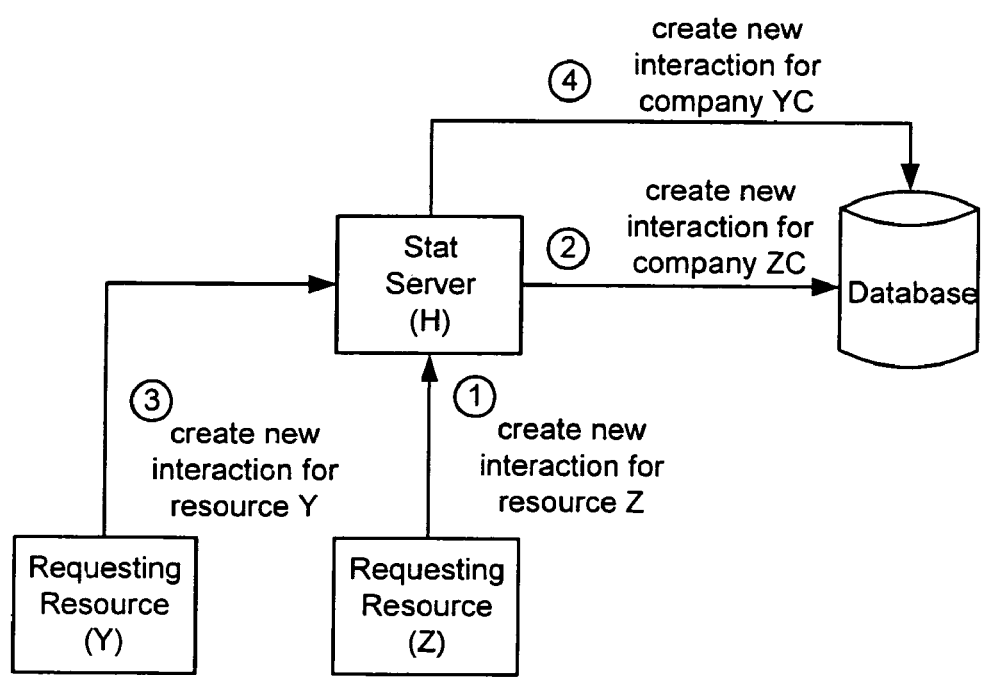

Fig. 32 - Creating or Updating Service Controls on a Company
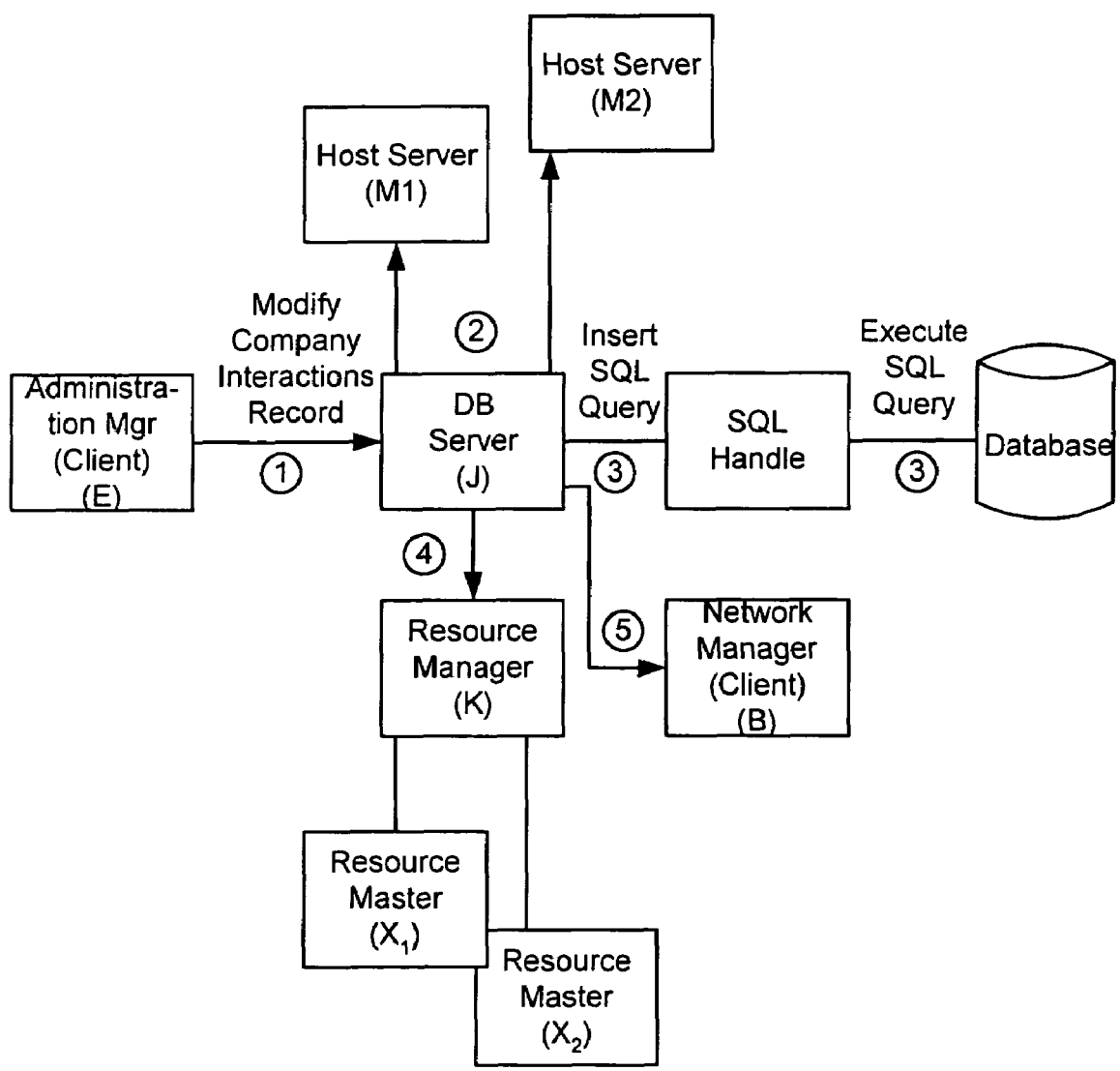

Fig. 33 - Processing and Accepting a New Interaction
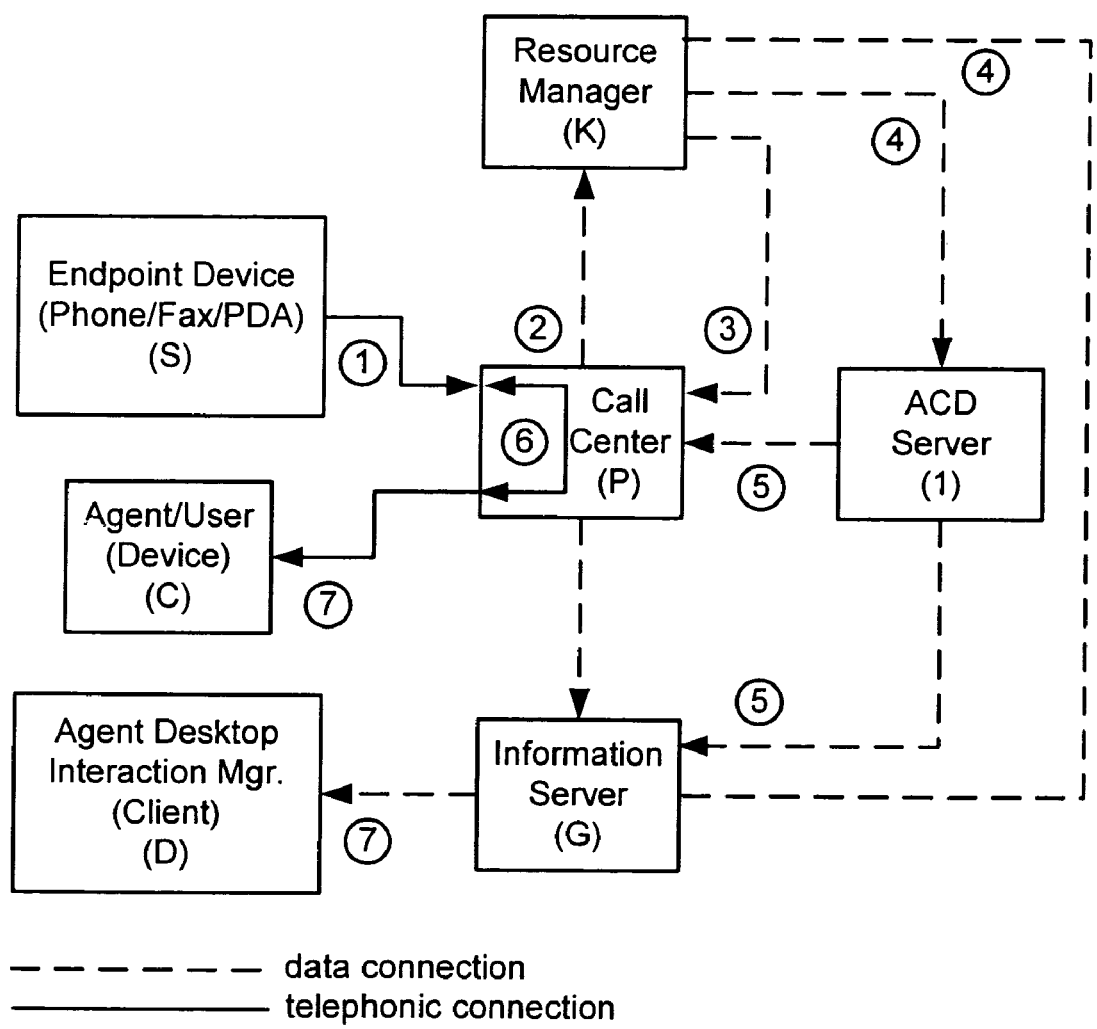

Fig. 34 - Processing and Denying a New Interaction
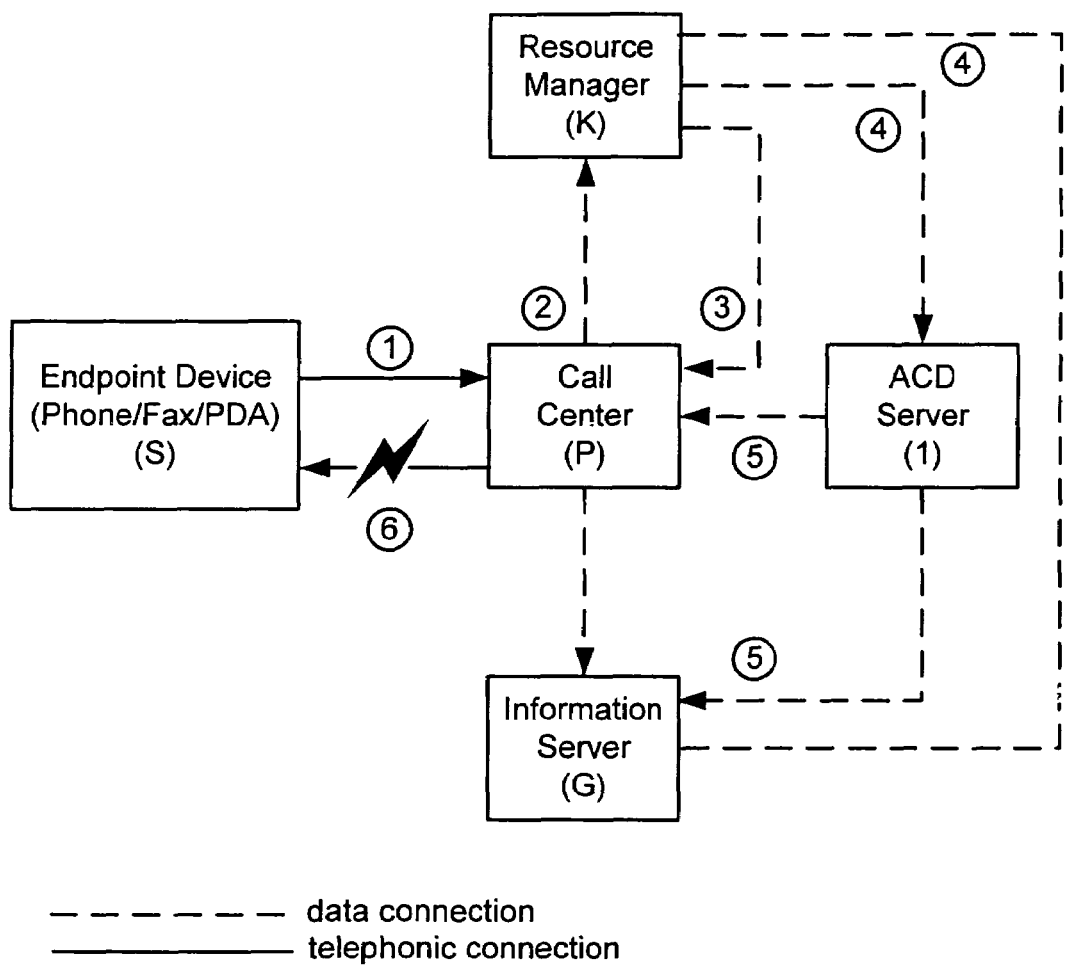

CALL CENTERS FOR PROVIDING CUSTOMER SERVICES IN A TELECOMMUNICATIONS NETWORK

RELATED APPLICATIONS

This application claims the benefit as continuation application under 35 U.S.C. §120 from U.S. patent application Ser. 09/638,274 entitled, "CALL CENTERS FOR PROVIDING CUSTOMER SERVICES IN A TELECOMMUNICATIONS NETWORK", filed on Aug. 14, 2000 now U.S. Pat. No. 6,697,858, which is incorporated herein by reference in its entirety.

FIELD OF THE INVENTION

This invention relates to software-based telecommunications call center provisioning, management, and supervision.

BACKGROUND OF THE INVENTION

Organizations with more than trivial needs for customer interaction often use call centers to provide services to their customers and to organize sales personnel. A call center is a central place where an organization (company) handles customer and other calls, usually with some amount of computer automation. Typically, a call center can handle a considerable volume of inbound and outbound calls at the same time, to screen inbound calls, forward them to agents with appropriate skills, and to maintain records of the calls and the call center agents. Call centers have traditionally been used by mail-order catalog companies, telemarketing companies, computer product help desks, and large organizations that use the telephone to sell or service products and services.

With the advent of the information revolution of the 1980's and 90's, customer interactions often involve communications through alternative channels, such as facsimile (fax) transmissions, email, and web-based contacts. (We will generically refer to these interactions and the conventional telephone calls as "e-contacts," "contacts," "interactions," or simply as "calls.") The individual agent skills required for a particular customer interaction depend on the nature of the customer's need and the customer's identity; the skills generally do not depend on the specific type of e-contact made, be it by telephone, email, fax, or web-based. Therefore, it is desirable call center efficiency and flexibility by allowing the agents to respond to contacts based on agent skills, and without differentiation based on contact type.

Individual handling of interactions is expensive. The expense rises whenever a specific interaction cannot be handled immediately, requiring rerouting and handling by multiple agents. Moreover, customers tend to get frustrated when their contacts are rerouted. It would be advantageous to pre-process received calls to identify the most appropriate agents and to link the call to relevant information available to the agents. To some extent this is already done through the use of Interactive Voice Response ("IVR") systems, but IVR systems tend to irritate customers and, in any event, it would be desirable to pre-process contacts automatically and without regard to the specific contact type or medium.

Because a call center is the focal point of customer interaction for a typical company, its failures damage the company's good will and often result in immediate loss of sales. It is important for the call center to have high reliability. One way to achieve it is through distributed, fault-tolerant design. By "fault-tolerant design" we do not mean a merely "fail-safe design," where the system has built-in redundancy and can restart a failed process or switch to its equivalent and continue operations after a brief interruption. Because even a brief interruption can cause dropped calls, it is preferable to have a seamless transition to the back-up process without dropping calls.

In a competitive environment, a company need not be a "dot-com" to require a functional call center within a short time. But provisioning such a center in the modern eclectic telecommunications environment is a labor-intensive, long, and complicated task usually performed "integrators." It is highly desirable to have the capability to provision call centers quickly and without the massive efforts of trained technicians, engineers, and programmers.

A call center's need for resources varies with many factors, such as the time of day. For example, some call centers are busiest in the early evening, the time telemarketers believe to be most propitious for credit card applications and long-distance telephone service selection. In contrast, call centers for business-related services are busiest during regular business hours. For this reason, it would be advantageous to share call center resources with additional call centers, or even with completely different applications. More particularly, it is desirable to be able to shift resources between applications, starting and stopping the resources seamlessly, without disturbing existing calls and without preventing immediate processing of new calls. Similarly, it is desirable to have dynamic balancing, adding and stopping resources when usage or availability of physical hosts changes.

In fact, any high volume telecommunications environment would benefit from resolution of the needs described above. A typical high volume telecommunications environment may have thousands, even millions, of dedicated lines, often operating inefficiently because each company has dedicated telephone lines and associated hardware, such as PrivateBranch Exchanges (PBXs), Automated Call Distributors (ACDs), IVRs, Fax Servers, Conferencing Bridges, Internet Chat Servers, or Voice Over IP (VoIP) Gateways. The hardware, dedicated lines, and other facilities can be hosted by the service provider or a telephone company. These resources are not shared among the various companies and operate inefficiently as a whole. Shared use is therefore desirable to achieve economies of scale and to allow efficient re-distribution or re-allocation of such resources.

Another desirable feature is flexibility in limiting call center use, so that the call center operator (or licensor) can provide various billing and service packages to the companies.

SUMMARY OF THE INVENTION

Accordingly, aspects of the present invention provide technical advantages that solve one or more of the needs listed above.

One aspect of the invention is the capability to create, configure, deploy, and manage a distributed, software-based call center architecture for wide (e.g., global or regional) network of disparate media and communication types with one or more points of cohesive control and configuration in a way that non-programmers can manage the call center network.

Another aspect is the capability to provision multimedia, communication, and server resources as they come on line, without disruption of existing services, with dynamic removal and addition of the resources, so that the network can expand or collapse without service interruption.

A third aspect is the call center network's capability to adjusts load distribution dynamically, in real time, performing load balancing automatically as the resources stop, are reconfigured, or added.

A fourth aspect is mirroring of some or all processes, servers, and functions, so no single point of failure can disrupt service on the network. Mirroring in combination with load balancing described in the paragraph immediately above achieve redundancy and fault-tolerance across the network, with self-healing properties and soft recovery without major disruptions to the call center.

According to a fifth aspect, certain of the call center resources can be partitioned among two or more companies. Private data, routing rules, libraries, and other attributes of each partition are used to service one company. Partitioning optimizes the use of shared hardware and network shared resources, and preserves customization and private data of each company.

In the sixth aspect, the call center provides the ability to package and bundle network resources for each company, and to track and limit use for each company with a class of service controls. This can be achieved, for example, by limiting the number of simultaneous interactions between a company's call center and its customers.

The seventh aspect is the ability to reconfigure and expand hardware devices so that they can be dynamically put into service on the call center network without service disruption. The additional hardware can then be host-partitioned and dynamically configured to allocate resources to one or more companies. The hardware devices include, for example, Customer Premises Equipment (CPE) signaling interfaces, network signaling interfaces, voice, fax, data processing, connection, conferencing, and switching devices.

The multimedia call center of this invention may be logically located either between a telephone network and CPE, or between two portions of a telephone network. It accepts incoming calls and extracts in-band network routing and origination information, such as automatic number identification information (ANI) or packet based network routing information. The call center then uses the extracted information to obtain information relating to the call from its database. Next, the call center places a call to an endpoint agent or service that may be selected based on the extracted information and information obtained from the database. The information may also be forwarded to the endpoint.

The call center's processes are distributed, running on several hosts of the call center's network. To optimize the use of hardware and network devices, the resources can be divided into dedicated and shared resources. Sharing of servers, other hardware, and processes achieves optimal economies of scale in the network.

Resource allocation is performed by the Administration Manger interface. A project (a logical company) defines the specific telephone numbers associated with each physical company using Dialed Number Identification Service (DNIS), allowing sharing of the physical trunks among several companies. The administrator of the call center can use the Administration Manager to add, modify, and remove projects on behalf of each company. Because of the distributed design, dynamic load balancing, dynamic resource provisioning and allocation, self-registration of the resources, and host partitioning, project changes and hardware additions can be done while the network is running, without service interruptions.

When a company is created or modified using the Administration Manager, all associated dedicated resources are automatically assigned to that company. Dedicated resources may include the Information Server, ACD Server, Chat Server, Collaboration Server, and the E-Mail Distributor. Shared resources made available to the company include the Stats Server, DB Server, Resource Manager, Unified Mail Server, Host Server, Scheduling Server, and the Call Center. (A listing of shared and dedicated resources appears in tables 2, 3, and 4 in the detailed description of the invention section of this document.) Multiple resources of each type can be added to expand the call center capacity, and each resource can be mirrored for hot back-up.

A particular company's use of the call center and the center's associated network can be controlled by limiting access to certain resources and/or limiting the number of simultaneous transactions allowed per company. The number of simultaneous interactions per company can be modified at any time without stopping any resource. These Service Controls are tracked and monitored by the Resource Manager. When service control limits are reached, the Resource Manager will inform the company's resources to stop processing additional resource requests. After the company's use of resources recedes below the service control limits, through completion or termination of existing transactions, the Resource Manager allows processing of additional resource requests.

BRIEF DESCRIPTION OF THE DRAWINGS

FIG. 1 illustrates the call center in Telephone, Mobile or internet-Type Network-Level Deployment.

FIG. 2 illustrates the call center in Customer Premises Equipment EnterpriseLevel Deployment.

FIG. 3 illustrates the call center Architecture.

FIG. 4 illustrates the call center Call Flow Diagram.

FIG. 5 illustrates the Real-Time Network Updates of Hardware Using Administration Manager.

FIG. 6 illustrates Startup and Real-Time Registration of New Hardware Configuration.

FIG. 7 illustrates Shares and Dedicated Resource Registration.

FIG. 8 illustrates call center Multimedia Network Overview.

FIG. 9 illustrates Architectural Overview of Network Manager.

FIG. 10 illustrates Starting the Network Manager to Get Network Characteristics and Status.

FIG. 11 illustrates Adding a New Resource Dynamically Using the Network Manager.

FIG. 12 illustrates Stopping a Resource Using the Network Manager (No Service Disruption).

FIG. 13 illustrates Real-Time Network Updates of Customer Records Using Network Manager.

FIG. 14 illustrates Starting a New Resource Dynamically.

FIG. 15 illustrates Automatic Registration of New Resource.

FIG. 16 illustrates Stopping a Resource Dynamically.

FIG. 17 illustrates Starting and Registering Resources Dynamically (One Shares Resource Available).

FIG. 18 illustrates Requesting a Specific Resource Type (One Shared Resource Available).

FIG. 19 illustrates Connecting to and Sharing a Requested Resource.

FIG. 20 illustrates Starting and Registering Resources Dynamically (Multiple Resources Available).

FIG. 21 illustrates Requesting a Specific Resource Type (Multiple Resources and Load Balancing).

FIG. 22 illustrates Load Balancing between Requested Resources.

FIG. 23 illustrates Starting Mirrored Resources.

FIG. 24 illustrates Automatic Registration of Mirrored Resources.

FIG. 25 illustrates Mirrored Resource Communication with Other Resources.

FIG. 26 illustrates Mirrored Resource Abnormal Shutdown (Part 1).

FIG. 27 illustrates Mirrored Resource Abnormal Shutdown (Part 2).

FIG. 28 illustrates Shared and Dedicated Resource Registration.

FIG. 29 illustrates Connection to a Shared Resource.

FIG. 30 illustrates Handling Requests to a Shared Resource.

FIG. 31 illustrates an Example of Requests to Stat Server to Create Interaction Histories.

FIG. 32 illustrates Creating or Updating Service Controls on a Company.

FIG. 33 illustrates Processing and Accepting a New Interaction.

FIG. 34 illustrates Processing and Denying a New Interaction.

DETAILED DESCRIPTION OF THE INVENTION

A first embodiment of the call center is designed for interfacing between two types of telecommunications equipment, such as a switch in the public switched telephone network and CPE.

The call center of this embodiment has a network signaling interface (NSI) for receiving telephone calls from the switch and a CPE signaling interface (CPESI) for forwarding the calls to the CPE. A processor is connected to the NSI and CPESI. Both interfaces and the server operate under direction of a controller.

The processor detects the type of each received call (e.g., voice, fax, data) and extracts network routing and/or origination information from the call, and transmits the routing and origination information to the controller. The controller decides on the specific destination address for the call (e.g., endpoint agent or service), creates new routing information, and may insert additional information in the call. The controller then instructs the processor to forward the call to the CPE. The processor may also include a conference organizer to connect conference calls between the agents and outside callers.

The controller receives the routing and type information from the processor and accesses a database using at least a portion of the network routing, origination, and destination information as a retrieval key. For example, the controller can decide on the most appropriate agent to service the call based on the residence address associated with the origination information in the database and the call's DNIS.

FIG. 1 shows the logical placement of call center System 10 (CALL CENTER 10) in a telephone network comprised of class 4 tandem soft/packet or circuit switch or mobile tandem switch 20 and class 4 tandem soft/packet or circuit switch or mobile tandem switch 30. The communications link between switch 20 and CALL CENTER 10 is T1 digital carrier, E1 digital carrier, or packet-based carrier 25. This communications link transmits in-band or packet-based network routing and/or origination information in the form of, for example, ANI information and/or DNIS information, along with regular telephone communications. CALL CENTER 10 detects the ANI information on each channel of T1 or E1 digital carrier or packet-based carrier 25 and transmits it, out-of-band, on a communications link 35 to equipment 37.

Host Server and other Group Two CALL CENTER Resources 37 utilize the out-of-band information in a manner which will be set forth in detail below to provide CALL CENTER 10 with address information for each channel. CALL CENTER 10 then accesses the communications link between CALL CENTER 10 and switch 30, i.e., carrier 26, and transmits on each channel an in-band address which is determined from the network routing and/or origination information obtained from each channel on carrier 25 and from the information transmitted back to CALL CENTER 10 from Host Server and other Group Two Call Center Resources 37 over data link 35. Although we have shown the telephone network in FIG. 1 to be comprised of class 4 tandem soft/packet or circuit switches or mobile tandem switches 20 and 30, it should be appreciated that this is not meant to limit the environment where the present invention may be utilized. Specifically, a telephone network which utilizes embodiments of the present invention may be the public switched telephone network (PSTN) or it may be a private network. In either case, each of the switches 20 and 30 may be a toll center switch, an operator service centers, an interexchange carrier, a point of presence switch, or any similar apparatus.

Further, although communications link 25 and 30 are shown as T1 or E1 digital carriers or packet-based carriers, the specific type of the links used is not critical; various other links can be used, including the following: analog E&M signaling trunks, Frame Relay, Cellular Packet Data, ATM Network, or TCP/IP Network.

FIG. 2 shows the logical placement of CALL CENTER 40 in a business environment where CALL CENTER 40 provides an interface between a PSTN or other network comprised of class 4 tandem soft/packet or circuit switch or mobile tandem switch 20, and a business customer premises equipment (business CPE) comprised of digital PBX 50. The communications link between switch 20 and CALL CENTER 40 is a T1 or E1 digital carrier or packet-based carrier 25. This communications link transmits network routing and/or origination information in the form of, for example, ANI information and/or DNIS information along with regular telephone communications. CALL CENTER 40 detects the ANI information on each channel of carrier 25 and transmits it, out-of-band, on a communications link 45 to equipment 47, which utilizes the information in a manner that will be set forth in detail below to provide CALL CENTER 40 with address information. CALL CENTER 40 then accesses the communications link between CALL CENTER 40 and digital PBX 50, i.e., carrier 26, and transmits an in-band address on each channel; the address is determined from the network routing and/or origination information obtained from each channel on carrier 25, and from the information transmitted back to CALL CENTER 40 from host 47 over data link 45.

Again, the telephone network which utilizes the present invention may be PSTN or a private network; and the class 4 tandem soft/packet and circuit switch or mobile tandem switch 20 may be a toll center switch, operator service center, an interexchange carrier, point of presence switch, or other similar apparatus. Further, although, we have shown the business CPE in FIG. 2 to be comprised of digital PBX 50, it should be appreciated that this is not meant to limit the environment where the present invention may be utilized. Specifically, a business environment that utilizes embodiments of the present invention may be an automatic call distributor (ACD) or similar equipment. Finally, the type of communications links 25 and 26 is not critical. Each link may be any one of a number or digital or analog communications links, including analog E&M signaling trunks, Frame Relay, Cellular Packet Data, ATM Network, or TCP/IP Network.

FIG. 3 shows a block diagram of CALL CENTER 100 in accordance with the present invention. Here, CALL CENTER 100 is connected by lines 120 to the public telephone network, and by lines 130 to business customer premises equipment (business CPE), such as a PBX, an ACD, or other similar business CPE.

Before we describe the embodiment of CALL CENTER 100 in detail and set forth how it provides its inventive functions, we provide an overview of its general operation.

The CALL CENTER receives a telephone call signal with in-band or packet based network routing and/or origination information. The CALL CENTER detects and decodes the routing information and accesses a database, either local or remote, using at least a portion of the routing information as a retrieval key to retrieve information pertaining to the calling party and the called party. For example, the retrieved information may indicate the calling party's name, address, history of prior transactions, the type of transaction, and a particular type of operator to handle the transaction. The in-band information may indicate that the calling party desires to purchase a particular type of product; for example, a multiplicity of incoming "800" number requests may all be routed by the PSTN or other network to a particular business PBX; the last four numbers of the telephone number may indicate a specific type of purchase transaction and, as a result, the received information would correspond to the address at the CPE that handles such transactions; it may also include the address of the next available workstation or mobile device that handles such transactions. Using the retrieved information, the CALL CENTER sends the incoming telephone call signal to the CPE after it inserts new network routing and/or origination information, or reroutes the call signal to an address at the CPE, so that the signal is routed by the CPE to the desired called party (agent).

As shown in FIG. 3, CALL CENTER 100 is comprised of network signaling interface (NSI) 140. NSI 140 provides access over lines 120 from the DSTN to CALL CENTER 100. NSI 140 appears to the PSTN or other network to be physically identical to a business CPE, such as a PBX or an ACD. Further, although NSI 140 may operate on an analog or digital basis, it is capable of performing the following functions:

(1) recognize an incoming request for service from a calling party using the PSTN or other network over lines 120 and be able to report same to controller 180 of CALL CENTER 100 over lines 185; and (2) acknowledge a request for service from the PSTN or other network over lines 120 in response to commands transmitted thereto over lines 185 from controller 180.

Note that in some embodiments, some of lines 120 may service a single party, while other lines 120 may service a multiplicity of parties by means of a multiplex scheme such as that used on T1, E1, or packet-based carriers.

NSI 140 is preferably built with one or more of the following products: digital telephony interface D240SC-T-1 boards, digital telephony interface D480SC-2-T-1 boards, or Voice over LP DMIP2431A-T1 boards, all of which are available from Dialogic Corporation, 1515 Route 10, Parsippany, N.J. 07054.

As shown in FIG. 3, CALL CENTER 100 is further comprised of customer premises equipment signaling interface (CPESI) 160. CPESI 160 provides access over lines 130 from CALL CENTER 100 to business CPE. CPESI 160 appears to the CPE to be physically identical to the PSTN; i.e., CPESI 160 "presents" the PSTN to the business CPE. Further, although CPESI 160 may operate on an analog or digital basis, it should be capable of performing the following functions: (1) make a request for service to the business CPE over lines 130 in response to commands transmitted thereto over lines 175 from controller 180; and (2) transmit an in-band destination address, for example a particular extension number, to the business CPE over lines 130 in response to commands transmitted thereto over lines 175 from controller 180; and (3) to detect when the business CPE and the called party, for example a business agent, has answered. Lines 130 may service a single party, or a multiplicity of parties by means of a multiplex scheme.

CPESI 160 can be implemented with digital telephony interface D240SC-T-1 boards, digital telephony interface D480SC-2-T-1 boards, or Voice over EP DMIP2431A-TI boards, available from Dialogic Corporation. CPESI 160 may include equipment so as to fully comprise the functions of signaling and support of a direct telephone extension; in such case, one may utilize modular station interface boards or Voice over LP boards, such as MSI/80SC-Global, MSI/240SC-Global, or DMIP2431A-T1, all of which are also available from Dialogic Corporation.

As shown in FIG. 3, CALL CENTER 100 is further comprised of voice and data processing means 170 (VDPM 170). VDPM 170 provides the following functions:

(1) generate digitized or synthesized progress tone output signals for transmission to NSI 140 over lines 165, for ultimate transmission to the PSTN or other network over lines 120, and to CPESI 160 over lines 155 for ultimate transmission to the business CPE over lines 130, in response to commands from controller 180 received over lines 195;

(2) detect and decode addressing, i.e., telephone numbers, call progress signals, network routing and/or origination information, and other identification signals, including dual tone multi-frequency signals (DTMF) and multi-frequency tones (MF), that were received from the PSTN over lines 120 and transmitted to VDPM 170 over lines 165, or that were received from the business CPE over lines 130 and transmitted to VDPM 170 over lines 155, and transmit same to controller 180 over lines 195;

(3) code and transmit addressing (i.e., telephone numbers, network routing and/or origination information, and other identification signals, including DTMF and MF) to CPESI 160 over lines 155 in response to commands from controller 180 over lines 195, for ultimate transmission to the business CPE over lines 130; and (4) transmit audio announcements to the PSTN or to the business CPE. VDPM 170 can be built with voice communication system D240SC-T1, available from Dialogic Corporation.

As shown in FIG. 3, CALL CENTER 100 is further comprised of connection and switching means 150 (CSM 150). CSM 150 provides the functions of connecting and switching, on an analog or digital basis, individual circuits in NSI 140 to individual voice and data processing circuits within VDPM 170, or to individual circuits within CPESI 160; and the function of connecting and switching, on an analog or digital basis, individual circuits in CPESI 160 to individual voice and data processing circuits within VDPM 170, all in response to commands transmitted thereto over lines 145 from controller 180. Embodiments of CSM 150 are commercially available. For example, one may utilize a portion of the D240SC-T-1, referred to above, to switch by means of time-division multiplex (TDM) switching. The D240SC-T-1 permits switching between a T-1 digital telephony interface input, which carries 24 telephone conversations, and either an expansion bus on controller 180, which connects to CPESI 160, or, to any of the voice processing circuits of VDPM 170.

CALL CENTER 100 of FIG. 3 also comprises controller 180. Controller 180 manages and coordinates the activity of the components of CALL CENTER 100. Controller 180 comprises the following parts: a central processing unit 181 (CPU 181), memory and memory controller 182, I/O interfaces 183, and communications interface 190. In addition, controller 180 may comprise a local database for retrieving information pertaining to the received network routing and/or origination information. Communications interface 190 provides communication of various information to an external host computer (not shown) which itself may have a database, and/or a workstation (not shown), which is operated in connection with an external host computer and/or a human operator.

Specifically, in one embodiment, CALL CENTER 100 is comprised of a local database, the information transmitted over communications interface 190 may include ANI and/or DNIS information, and information retrieved from the local database using the ANI and/or the DNIS information, all of which is transmitted in a predetermined format. In another embodiment where CALL CENTER 100 does not include a local database, the information transmitted over communications interface 190 may include the ANI and/or the DNIS information in a predetermined format. In a preferred embodiment of the present invention, controller 180 is an IBM compatible personal computer (PC). Communications interface 190 may be obtained commercially from many sources, such as DCA of Alpharetta, Ga., and AST of Irvine, Calif.

Although FIG. 3 shows an embodiment of the inventive CALL CENTER that operates as an adjunct between the PSTN represented by, for example, a tandem switching machine, and a business environment represented by, for example, a digital PBX, the CALL CENTER may also operate as an adjunct between two portions of the PSTN or a private telephone network. In the latter environment, CPESI 160 of FIG. 3 would be replaced by an interface which is capable of performing functions that are analogous to the functions performed by CPESI 160, as described above, with the specific apparatus of the PSTN or the private telephone network with which the interface is to be connected.

We now turn to the flowchart of FIG. 4 describing the operation of CALL CENTER 100 for handling an incoming call. At point 200, CALL CENTER 100 is waiting for a request for service from a calling party over the PSTN or other network. Such requests are typically made in the form of the application of a ringing signal in an analog interface to the PSTN, in the form of a signaling bit transition in a digital interface to the PSTN, or in the header of a packet in the case of a Voice over IP call. Such requests are received, detected, and decoded by NSI 140 (see decision box 205). For example, NSI 140 may detect an incoming telephone call from a calling party customer who is requesting service from the business CPE, or by detecting loop current in a telephone line accessed by the calling party customer; NSI 140 then transmits a message regarding the detection event to controller 180 over lines 185. At point 210, after receiving the message from NSI 140 that a request for service has been detected, controller 180 sends a command to CSM 150 over lines 145, to connect a voice and data processing circuit in VDPM 170 to the circuit in NSI 140 that has the pending request. Then, controller 180 sends a command to NSI 140 over lines 185 to cause it to acknowledge the request for service. Such acknowledgement generally takes the form of an "off hook" signal presented to the PSTN in an analog interface, or the form of a momentary application of a signaling bit toward the PSTN in a digital interface.

As shown at point 215, A new interaction record message is now sent by the CALL CENTER 100 to the Resource Manager (K, FIG. 8). The interaction record contains information regarding the purpose of the call, and hence the company the call is intended to reach. The Resource Manager keeps information on usage restrictions and class of service for every company, so that the resources can be allocated to them based on their service level. This is where the number of simultaneous interactions allowed per company is managed. The Resource Manager next confirms that the new interaction request is consistent with the number of simultaneous transactions allowed for that company. This information is in the memory dedicated to the Resource Manager, which is updated from the network database whenever new or modified service control entries are made for any company.

At decision point 216, the call is either allowed to continue or terminated. In the case of the call being allowed to continue, the Resource Manager has determined that the service control thresholds for this interaction request have not been exceeded. Based on this verification, the Resource Manager, sends a message back to the CALL CENTER 100 that it is authorized to continue the transaction. Similarly, the Resource Manager will send a verification message to the Collaboration Server (Q, FIG. 8) or the E-mail Distributor (R, FIG. 8), for Internet-based interaction requests. The Resource Manager informs the ACD Server (I, FIG. 8), and the Information Server (G, FIG. 8), that the request has been approved.

In the case of the call being denied and ultimately terminated, the Resource Manager has determined that the service control thresholds for this interaction request have been exceeded. Based on this verification, the Resource Manager sends a message back to the CALL CENTER (P, FIG. 8) that it is not authorized to continue the transaction. The Resource Manager also informs the ACD Server and the Information Server that the request has been denied. In the case of the call being denied, Controller 180 transfers control to point 330 to terminate the interaction with the calling party. Optionally, in this denial scenario, in the case of a telephone-based transaction, the CALL CENTER 100 may connect the caller to a VDP 170, either to play a busy signal, or an "all circuits busy" message to the caller. In this fashion, requests for interactions are limited as defined by the service control thresholds set for each company. Similarly, the Resource Manager may send a verification message to the Collaboration Server for Internet-based interaction requests. In the case of a video transaction request or a Web Chat request sent via the Web Servlet (T, FIG. 8), an HTML-based screen or voice message will be played asking the caller to try again later.

At point 220, VDPM 170 receives and decodes network routing and/or origination information signals that are sent from the PSTN or other network. Such network routing and/or origination information signals can take the form of dial pulse digits, DTMF digits, MF digits, packetized data, or common channel signaling. The network routing and/or origination information signals will typically be present in DID (Direct Inward Dial), DNIS, ANI, or ISDN (Integrated Services Digital Network) formats, and are used to automatically identify the destination path for the call, the intended purpose for the call, and/or addressing information concerning the calling party.

At point 230, controller 180, in conjunction with VDPM 170, has collected the network routing/origination information. If controller 180 has a local database, it retrieves a set of data from the local database using at least a portion of the ANI information as a retrieval key. If controller 180 does not have a local database, controller 180 communicates with a remote database in a host computer (not shown) via communications interface 190 and transmits at least a portion of the ANI information to it. In one embodiment of the present invention, the host computer accesses the remote database, retrieves data therefrom, and transmits at least a subset of the data back to controller 180 over communications interface 190. In particular, the subset may include data such as a specific CPE address of a workstation or operator who has been designated to handle calls of a particular type, or to handle calls from a particular class of calling parties. Further, the subset of data may include the name, address, previous transaction history, and purpose of the call for the particular calling party.

As shown at point 240, controller 180 transmits at least a portion of the subset of data to a workstation over communications interface 190. Such information may be used by the workstation, for example, for displaying a message on a CRT screen or mobile computing device for an agent who will be connected to the calling party, which message may indicate the purpose of the call and possibly additional data in a predetermined format to facilitate an efficient interaction between the calling party and the agent. The workstation or mobile computing device may present the data to the human operator at a predetermined time before the calling party is connected to the human operator or at some predetermined time during their interaction. Alternatively, the predetermined set of data retrieved from the remote database may be transmitted directly to the workstation from the host computer without having to be routed through controller 180. In either embodiment, the end result is that an agent may interact with a calling party after data pertaining to that party is automatically provided for the agent. This saves time required for transmittal of information between the calling party and the agent. For example, a substantial savings in time results in an interaction where the calling party desires to make a purchase and the agent automatically has been provided with the calling party's name and address.

At point 250, controller 180 commands CSM 150 to connect an available voice and data processing circuit from VDPM 170 to an available channel in CPESI 160; this advantageously permits VDPM 170 to perform the signaling. At point 260, controller 180 commands CPESI 160 to make a request for service from the business customer premises equipment (business CPE). Such request for service may comprise, for example, a ringing signal or a signaling bit state transition.

At point 270, controller 180 commands VDPM 170 to transmit address information over the path selected by CSM 150 towards CPESI 160. This addressing information may be comprised of some, all, or none of the network routing and/or origination information obtained from input line 120 at the start of the interaction, and the addressing information may comprise a portion of the predetermined set of data retrieved from either the local or the remote database. The addressing information may be useful in directing the business CPE to connect the calling party to a particular agent or workstation that can best interact with the calling party. For example, the network routing and/or origination information, along with at least a portion of the predetermined set of data, may indicate that the calling party is to be connected with an operator who deals primarily with a specific type of transaction, such as the purchase of a particular product, or that the calling party only speaks a particular language. Further, the remote database may include information concerning which one of a multiplicity of appropriate operators who deal with a particular type of transaction is available.

In another embodiment of the present invention, the ACD Server and the CALL CENTER 100 establish a communication link. The ACD Server and the Information Server also establish a communication link. Based on agent availability and available skills, the ACD Server reports to the CALL CENTER 100 which agent to connect the caller to. Agent availability is determined based on the state of an agent's Agent Desktop Interaction Manager or Mobile Interface (D, FIG. 8). By polling the Agent Desktop Interaction Manager or Mobile Interface clients of the network, the Information Server reports to the ACD Server which agents are available. Similarly, the same availability statistics can be retrieved from mobile agents and cellular, handheld computers, or other wireless devices. Available skills are stored in the memory of the ACD Server. Routing algorithms stored in the ACD Server determine the most appropriate agent to send the interaction to. The algorithms are based on agent skills, skill weight, agent cost, and other variables. In such a case, the data transmitted to controller 180 would include addressing information for accessing the selected agent.

At point 280, CPESI 160 awaits an acknowledgement from the business CPE of the request for service from CPESI 160. Such acknowledgement may comprise an offhook signal presented by the business CPE or the momentary application of a signaling bit change toward CPESI 160. If CPESI 160 does not receive an acknowledgement from the business CPE, controller 180 transfers control to point 330 to terminate the interaction with the calling party. Alternatively, at point 290, controller 180 may command CSM 150 to connect a circuit from VDPM 170 to the active circuit in NSI 140 and command VDPM 170 to provide a voice announcement to the calling party that the call cannot be completed at this time. Controller 180 then transfers control to point 330 to terminate the interaction with the calling party.

If CPESI 160 receives an acknowledgement from the business CPE, controller 180 causes CPESI 160 (and VDPM 170, if necessary) to complete answer supervision with the business CPE in a manner which is well known to those of ordinary skill in the art.

At point 300, controller 180 may wait to receive a signal from, for example, a remote host computer system over communications interface 190, that an agent is available to service the calling party. If an agent is not available for a predetermined length of time, control is transferred to point 330. If an agent is available, controller 180 commands CSM 150 to connect a circuit from VDPM 170 to the active circuit in CPESI 160, and commands VDPM 170 to provide a voice announcement to the agent to aid in the call identification process (this optional step is not shown).

At point 310, controller 180 commands CSM 150 to disconnect any circuits in VDPM 170 that are connected to either the NSI 140 circuit or the CPESI 160 circuit, and to connect the calling party interfaced with NSI 140 to the business CPE interfaced with CPESI 160. This provides a full connection or communications path between the calling party and the agent, workstation, or mobile computing device.

As shown at point 320, the communications path remains intact until NSI 140 detects a disconnect signal from the PSTN indicating that the calling party has hung up, or until CPESI 160 detects a disconnect signal from the business CPE indicating that the agent or workstation has hung up.

As shown at point 330, controller 180 commands CSM 150 to remove the connection between NSI 140 and CPESI 160, and commands NSI 140 and CPESI 160 to signal appropriate disconnects to the PSTN and the business CPE, respectively, by, for example, presenting "on hook" signals thereto. At point 340, optionally, controller 180 commands CSM 150 to connect a circuit from VDPM 170 to the active circuit in NSI 140, commands VDPM 170 to provide a voice announcement to the calling party that the call was terminated, or commands CSM 150 to connect a circuit from VDPM 170 to the active circuit in CPESI 160 to provide a voice announcement that the call was terminated. The transaction may be logged at point 350. Transaction logging may include updating a local database or updating a remote database by transmitting transaction information thereto over communications interface 190. Such transaction information may include network routing and/or origination information, a predetermined set of the initially retrieved data, called party information, and call duration. The operation then continues at point 200.

As one can readily appreciate from the above, CALL CENTER 100 conserves resources by automatically providing information that would otherwise have to be provided through interaction between a calling party and an agent.

Note that embodiments of the inventive CALL CENTER disclosed above may include a time-division-multiplexer contained in the D240SC-T-1 board which may be used in CSM 150. However, the inventive CALL CENTER may also be implemented when one uses an equal number of NSI circuits, CPESI circuits, and VDPM circuits. In such embodiments there may be no need for a connection and switching means, because the various resources can be connected together on a one to one basis.

Note also that a multiplicity of CALL CENTERs can be networked together, acting as one network for a multiplicity of companies or clients of a service provider.

The present invention can be used with any application that requires an interface with a multiplicity of users and is not restricted to analog or digital interfaces over telephone lines. It is not restricted to use in an environment where the incoming calls originate from people. In fact, embodiments of the present invention may operate advantageously in an environment where the incoming calls originate from machines, e.g., fax machines.

FIG. 5 shows the logical placement of a CALL CENTER as it is being configured to be added to a multimedia network. In step (1), a new CALL CENTER (P) is created by populating a Host with the appropriate hardware resources for the CALL CENTER. This can include one or more CPESI, one or more NSI, one or more CSM, and one or more VDPM. This new CALL CENTER is connected to the multimedia network and to the PSTN or other network. The Administrator of the network now creates a new CALL CENTER hardware configuration record using the Administration Manager (E), and makes modifications as necessary, on behalf of a specific customer or company that will use this newly created CALL CENTER. The Administration Manager is used to create, add, modify or delete company records that are stored in the multimedia network database. When the Administration Manager is used to create or modify a company or CALL CENTER hardware configuration record, the DB Server (J) executes an SQL query, which in turn causes a new or modified field entry to be added in the database in the "company table" and in the "hardware configuration table," as appropriate. A specific Hardware ID is then assigned for each new hardware element in the CALL CENTER. A Company ID and associated Project ID are then used in other tables signifying that specific company's use of these new hardware resources. For example, the Project ID record will include specific trunks or trunk groups associated with the hardware and network signaling assignments, such as DNIS numbers, DID numbers, and in the case of Voice over IP circuits, TCP/IP addresses for associated packet-switch telephone numbers and extensions.

In FIG. 5, step (2), the DB Server tells each associated Host Server (M) to create a directory for each new company. This is done so data associated with that company—and only for that company—can be stored and retrieved. Such data includes "blobs" of information including monitoring recordings, for example.

In FIG. 5 step (3), The DB Server sends resource requirements and class of service information on the new company or modified company to the Resource Manager. The Resource Manager keeps information on usage restrictions and class of service for this company, so that resources can be allocated to it based according to its service level. This is where the number of simultaneous transactions allowed per company is managed. In addition, the DB Server provides information to the Resource Manager associated with specific Project IDs and their associated Hardware IDs as they relate to the new CALL CENTER and its attached Hardware.

In FIG. 5 step (4), The DB Server sends information on the new or modified company and the new or modified CALL CENTER to the Network Manager (B). The Network Manager automatically refreshes and adds the new company or modified company data and the new or modified CALL CENTER data to the graphical display (Graphical User Interface). Now the user can use the Administration Manager and the Network Manager to assign and configure other resources.

FIG. 6 shows the logical placement of an inventive CALL CENTER as it dynamically registers itself onto the multimedia network as an available resource. In FIG. 6, Step (1), The Network Administrator starts the new CALL CENTER with the Network Manager, and the Network Manager orders the Host Server to start the new CALL CENTER.

In FIG. 6, Step (2), the Host Server starts the new CALL CENTER.

In FIG. 6, Step (3), CALL CENTER checks its parameters and location information for the Resource Manager in the network database. The new CALL CENTER loads all of the data associated with the companies according to its Resource ID. In addition, the new CALL CENTER loads all of the data associated wits its new hardware. This includes loading information from the hardware configuration table, such as the specific Hardware ID that was assigned during its configuration for each new hardware element in the CALL CENTER. These and other tables signify a specific company's use of these new hardware resources. For example, a Project ID record will include specific trunks or trunk groups associated with the hardware and network signaling assignments such as DNIS numbers, DID numbers, and in the case of Voice over IP circuits, TCP/IP addresses for associated packet-switch telephone numbers and extensions.

In FIG. 6, Step (4), the new CALL CENTER establishes an open socket TCP/IP communication with the Resource Manager. The new CALL CENTER broadcasts its port addresses, host information, resource type, and mode to the Resource Manager. This broadcast includes all of the necessary information the network and other resources need to determine what hardware resources are available for use in the new CALL CENTER.

In FIG. 6, Step (5), the Resource Manager broadcasts the new CALL CENTER data, including the new CALL CENTER port address, host information, resource type, and mode to all other associated resources on a "need to know" basis. The Information Server and the ACD Server now know that a new CALL CENTER is available.

In FIG. 6, Step (6), the Information Server connects to new CALL CENTER over its open socket TCP/IP communications mechanism. The Information Server is now ready to broadcast its request when a new call (or another transaction) starts requiring the new CALL CENTER.

In FIG. 6, Step (7), the ACD Server connects to new CALL CENTER over its open socket TCP/IP communications mechanism. The ACD Server is now ready to broadcast its request when a new call (or another transaction) starts requiring the new CALL CENTER.

FIG. 7 shows a flow chart of the operation of one embodiment of the CALL CENTER in its initial configuration and live registration onto the multimedia network as an available resource. At 400, the multimedia network is running. The network may be comprised of one or more CALL CENTERS and associated hardware before new resources come on line. At 405, the system administrator populates a host computer with the appropriate hardware. This may include NSI, CPESI, CSM, and VDPM resources. Also at step 405, the network administrator loads the Host Computer associated with the hardware with the multimedia network installation software. This includes all of the Group Two CALL CENTER resource software and Group Three Network Resource software, which in turn include: the Stats (statistical) Server (H, FIG. 8), ACD Server, Information Server, DB Server, Resource Manager, Unified Mail Server (L, FIG. 8), Host Server, Scheduling Server (N, FIG. 8), Chat Server, Call Center, Collaboration Server (Q, FIG. 8), and E-Mail Distributor (R, FIG. 8). At 410, the host computer associated with this new CALL CENTER, having been properly configured with the appropriate hardware and having been loaded with all of the possible Group Two CALL CENTER Resources software and Group Three Network Resources software, is now attached to the network. This procedure includes the interconnection of T1, E1, and TCP/IP interfaces to the PSTN or other network, and data communications means to other computers associated with the multimedia network. The associated host computer is now turned on so control and administration software on the multimedia network can communicate with the new CALL CENTER. At 415, the system administrator uses the Administration Manager client to create new customer and Project IDs that will be associated with the new CALL CENTER.

Creating a new company and Project IDs includes the definition of new DNIS numbers, ANI designations, physical ports, and trunk facilities associated with the new CALL CENTER. At 416, all data associated with these company and hardware configurations is stored in the multimedia network database. At 420, the system administrator starts the new CALL CENTER using the graphical interface in the network Manager. The Network Manger orders the Host Manager associated with the new CALL CENTER to start the new CALL CENTER executable. At 430, the Host Manager associated with the new CALL CENTER starts the new CALL CENTER. At 440, the new CALL CENTER comes on line. At 450, the CALL CENTER checks its parameters and location information for the Resource Manager in the multimedia network database. At 460, the CALL CENTER checks its Resource ID from the multimedia network database to determine if it has been classified as a shared or dedicated resource. At 470, assuming the Resource ID for the CALL CENTER indicates a dedicated resource, the CALL CENTER loads company-specific hardware records from the database. At 480, assuming the Resource ED for the CALL CENTER indicates a shared resource, the CALL CENTER loads all of the data associated with the companies according to its Resource ID.

In addition, the new CALL CENTER loads all of the data associated with its new hardware, including information from the hardware configuration table. The hardware configuration table includes the specific Hardware ID that was assigned during its configuration for each new hardware element in the CALL CENTER. These and other tables signify a specific company's use of these new hardware resources. For example, a Project ID record will include specific trunks or trunk groups associated with the hardware and network signaling assignments, such as DNIS numbers, DID numbers, and in the case of Voice over IP circuits, TCP/IP addresses for associated packet-switch telephone numbers and extensions.

At 490, the new CALL CENTER establishes an open socket TCP/IP communication with the Resource Manager. The new CALL CENTER broadcasts its port addresses, host information, resource type and mode to the Resource Manager.

This broadcast includes all of the necessary information the network and other resources need to determine what hardware resources are available to use in the new CALL CENTER.

At 500, the Resource Manager determines if other resources in the multimedia network require the new CALL CENTER. If no other active resources connected to the Resource Manager are of the type requiring the new CALL CENTER, it remains idle. If the Resource Manager determines there are other resources on the multimedia network requiring the new CALL CENTER, the procedure continues to step 520. At 520, the Resource Manager broadcasts the new CALL CENTER data including the new CALL CENTER port address, host information, resource type, and mode to all other associated resources on a "need to know" basis. For example, a running Information Server and a running ACD Server would now know that a new CALL CENTER is available.

At 530, other multimedia network resources including one or more Information Servers and one or more ACD Servers connect to new CALL CENTER over their respective open socket TCP/IP communications mechanism. The Information Server is now ready to broadcast its request when a new call (or another transaction requiring the new CALL CENTER) starts. Likewise, the ACD Server is now ready to broadcast its request when a new call starts or another transaction requiring the new CALL CENTER is required.

At 540, the new CALL CENTER and all of its available hardware resources are connected to the network, running, and communicating with all of the associated resources that may need to use its capabilities. When a new request for service, transaction request, or other event associated with the call transaction is sensed, the new CALL CENTER is ready to process the request.

We now turn to address in more detail the network, the resources, and other modules of a representative CALL CENTER according to the present invention.

FIG. 8 is a high level overview of the CALL CENTER network. Logically, it is divided, somewhat arbitrarily, into four groups: Group One (Applications), Group Two (CALL CENTER Resources), Group Three (Network Resources), and Group Four (Network Endpoints and Devices). Tables 1, 2, 3, and 4 below list, respectively, the elements of the four Groups.

TABLE 1

Group One Elements: Applications

| Group | Element Type | Name and Designation | Purpose |
| --- | --- | --- | --- |
| One | Client Application | Mail Manager (A) | Re-Direct Failed Mail or Mail with Bad Addresses |
| One | Client Application | Network Manager (B) | Network Management of Call Center Network |
| One | Client Application | Interaction Manager (D) | Agent Desktop Call Control and Customer Access Record |

TABLE 1-continued

Group One Elements: Applications

| Group | Element Type | Name and Designation | Purpose |
|---|---|---|---|
| One | Client Application | Administration Manager (E) | Configure and Provision Network Features for Customers |
| One | Client Application | Supervision Manager (F) | Quality Monitoring, Recording and Supervisory Control |

TABLE 2

Group Two Elements: Call Center Resources

| Group | Element Type | Name and Designation | Shared Resource | Dedicated Resource |
|---|---|---|---|---|
| Two | Call Center Resource | Information Server (G) | No | Dedicated per Company Defined |
| Two | Call Center Resource | Stats Server (H) | Yes | No |
| Two | Call Center Resource | ACD Server (I) | No | Dedicated per Company Defined |
| Two | Call Center Resource | DB Server (J) | Yes | No |
| Two | Call Center Resource | Resource Manager (K) | Yes | No |
| Two | Call Center Resource | Unified Mail Server (L) | Yes | No |
| Two | Call Center Resource | Host Server (M) | Yes | No |
| Two | Call Center Resource | Scheduling Server (N) | Yes | No |
| Two | Call Center Resource | Chat Server (O) | No | Dedicated per Company Defined |

TABLE 3

Group Three Elements: Network Resources

| Group | Element Type | Name and Designation | Shared Resource | Dedicated Resource |
|---|---|---|---|---|
| Three | Network Resource | Call Center (P) | Yes | No |
| Three | Network Resource | Collaboration Server (Q) | No | Dedicated per Company Defined |
| Three | Network Resource | E-Mail Distributor (R) | No | Dedicated per Company Defined |

TABLE 4

Group Four Elements: Network Endpoints and Devices

| Group | Element Type | Name/ Letter Designation | Purpose |
|---|---|---|---|
| Four | Network Endpoints and Devices | Endpoint Device (C; S) | Direct Agent, User, or Caller Device, Including Phone, Fax, Personal Digital Assistant, etc. |
| Four | Network Endpoints and Devices | Web Servlet (T) | Access to Internet-Based Users Via Web Collaboration for Mail, Chat, Video, etc. |
| Four | Network Endpoints and Devices | Packet/Circuit/Hybrid Tandem Switch (T T) | Global or Regional Connectivity from Network to Network with Switching Elements |

We now describe the functionality of each element. Note, however, that not every element need be present in the CALL CENTER, and not every function listed need be supported.

Group One

Applications

Mail Manager (A)

The Mail Manager is a Group One application specifically designed to recover lost or error-based mail messages and allow the system administrator to take action on these messages. These can be voice mail, fax, or email messages. The Mail Manager performs the following tasks:

1) On start-up, the Mail Manager loads all message status based on communication with the Group Two CALL CENTER Resource called the Unified Mail Server;

2) Provides a graphical user interface for users to identify mis-addressed or error-based mail for manual re-direction or re-sending;

3) Sends revised status messages on re-sent messages to the Group Two CALL CENTER resource called the DB Server.

Network Manager (B)

The Network Manager is a Group One application designed as a client-side graphical user interface for global network management of the CALL CENTER network. The Network Manager is the user interface to the network. It allows the user to add, remove, modify, stop, or start any resource in the network dynamically, in real time, and without disturbing any other resource.

To do this, the user only needs to know general information about the host server, including it's location, type, and database information. The Network Manager performs the following functions:

1) Loads and updates all network information from and to the network database;

2) Communicates with the network through the host server(s);

3) Interacts with the host server(s): The host servers will stop and start processes and inform the network manager of the status of all the resources in the specific host machine(s);

4) Displays a graphical view of the topology of the network and shows how the servers are connected to each other by the host;

5) Displays details on any resource and its associated features and status in real time;

6) Allows the user to add, delete, or modify any resource and define the location of its associated executable in real time;

7) Allows the user to characterize each resource as being a Master or a Mirror process;

8) Allows the user to start or stop any process in the network;

9) Allows the user to monitor network activity and alarms, and specify email delivery addresses for alarms;

10) Allows the user to provision new companies' requested resources and specify what host in the network to put those resources on, in real time.

Interaction Manager (D)

The Interaction Manager is a Group One application designed as a client-side graphical user interface for desktop multimedia transaction call control, client record access and personal settings. The application provides the user with the ability to do the following:

1) View histories of multimedia transactions between any client and pull up detail on same;

2) Manipulate inbound and outbound multimedia transactions with a graphical user interface (soft phone);

3) Set-up and tear-down conferences;

4) Record multimedia transactions;

5) Create and modify multimedia histories, trouble tickets, help desk entries and other data associated with a client;

6) Send faxes, emails and URLs to clients based on libraries;

7) Configure and modify follow-me numbers, email addresses, agent status and basic agent configuration data.

Administration Manager (E)

The Administration Manager is a Group One application designed as a clientside graphical user interface for client company provisioning of skills, agents, users, supervisors, workgroups and other multimedia e-contact configurations. These modifications are made on behalf of client companies. The application provides the user with the ability to:

1) Run reports on multimedia transaction history on a user, agent, workgroup, project and company basis (used for billing and inter-departmental billback);

2) Create and assign skills for intelligent network routing;

3) Create and define skills and other attributes for agents, supervisors and users;

4) Create and define the locations for scripts, FAQs and multimedia push libraries;

5) Create and modify common gateway interface and HTML scripts for chat request screens and Web-based callback screens 6) Create and define company information to be used in configuring the network on behalf of a client with the Network Manager.

Supervision Manager (F)

The Supervision Manager is a Group One application designed as a client-side graphical user interface for the supervision and quality control of agents and users of the network. The user can do the following from any remote location:

1) Get real-time reports and broadcasts on network usage and agent statistics;

2) Monitor real-time activities of users including remote screen and audio monitoring;

3) Record user activities;

4) Establish undetected, private, and three-party monitoring on any transaction;

5) Provide instant messaging to all users for network alerts;

6) Barge-in, replace a user or agent on any conversation;

7) Close down user or agent conversation and log users off of the system remotely.

Group Two

Call Center

Resources Information Server (G)

The Information Server is a CALL CENTER resource. One Information Server is dedicated for each company defined as a client on the network. The Information Server is a bridge between Group One Application elements and other network resources. Its job is to provide information to client-side applications and to keep multimedia connections in context with the ACD queue and thus the users of the network.

If the Information Server fails, or the client application fails, both the ACD queue and the multimedia transaction itself remain intact. The transaction itself remains connected even without the client applications running.

Stat Server (H)

The Stat Server (or Statistical Server) is a CALL CENTER resource. One Stat Server can be shared among many companies/clients in a CALL CENTER network. The purpose of the Stat Server is to manage and save each CALL CENTER interaction in the network.

The Stat Server waits for messages from multiple servers and manages the interactions. Once interaction is finished, the Stat Server saves the interaction in the Interaction-track table of the database. The Stat Server will:

1) Save agents' login information in a login table;

2) Save agents status information in an agent status table; and

3) Save interaction outcomes, in an outcome table.

4) Send information Group One application Supervision Manager for real-time display of CALL CENTER statistics, including traffic, queue, and agent status information.

ACD Server (I)

The ACD Server is a CALL CENTER resource. One ACD Server is dedicated for each company defined as a client on the network. The purpose of the ACD Server is to:

1) Monitor the status of agents and users of the system;

2) Find available agents;

3) Find correct, or appropriate, agents defined by their skills;

4) Find correct, or appropriate, workgroups; and

5) Identify where calls should go.

The ACD Server does not actually switch multimedia transactions. The actual switching of the transactions is the job of the Group Three Network Resource called the CALL CENTER.

The ACD Server houses both inbound call routing and predictive/outbound algorithms that determine what resources should be used to handle various multimedia transactions.

DB Server (J)

The DB Server (database server) is a CALL CENTER resource. One DB Server can be shared among many companies/clients in a CALL CENTER network. The purpose of the DB Server is to broadcast in real time changes made in the Group One Application Administration Manager to all resources in the network. This is how changes to agents, workgroups, routing, etc., are achieved without disrupting service on the network.

Resource Manager (K)

The Resource Manager is a CALL CENTER resource. There is one Master Resource Manager shared among many companies/clients in a CALL CENTER network. The Resource Manager performs the following tasks:

1) Keeps track of all the resource in the network;
2) Keeps track of all agents in the network;
3) Keeps track of all the users in the network for load balancing between sites on a multi-site network;
4) Informs resources of new resources in the network;
5) Informs resources of other resource shutdowns; and
6) Provides alternate connections during resource shutdowns.

At start-up, Group One, Two, and Three network elements broadcast the information listed in Table 5 below to the Resource Manager as part of a real-time registration process.

TABLE 5

Start-Up Registration Broadcast to Resource Manager

| Packet Segment | Message Identifier | Description |
| --- | --- | --- |
| One | ID | Type and Name of resource coming on line |
| Two | Location | Host name of resource coming on line |
| Three | Port | Port Number of Resource Coming on line |
| Four | Capacity | Number of Clients or associated processes resource can handle |
| Five | Mode | Master or Mirror designation of Resource coming on line |
| Six | Company or Company List | List of Company IDs associated with Resource coming on line or the specific company associated with the resource. |

This is a typical representative, non-limiting registration process. More specific examples are found in Table 6.

TABLE 6

Example Resource Registrations to Resource Manager

| Packet Segment | Message Identifier | Description |
| --- | --- | --- |
| Stat Server Interface (Stat Server Informs Resource Manager) | | |
| One | ID | StatsServer ID |
| Two | Location | StatsServer host name |
| Three | Port | StatsServer port number |
| Four | Capacity | Number of clients it can handle |
| Five | Mode | StatsServer Mode: MASTER/MIRROR |
| Six | Company List | List of Company IDs |
| Information Server Interface (Information Server Informs Resource Manager) | | |
| One | ID | InfoServer ID |
| Two | Location | InfoServer host Name |
| Three | Port | InfoServer port |
| Four | Capacity | InfoServer capacity (number of clients) |
| Five | Mode | InfoServer Mode: MASTER/MIRROR |
| Six | Company | company handled by InfoServer |

Unified Mail Server (L)

The Unified Mail Server is a CALL CENTER resource. One Unified Mail Server can be shared among many companies/clients in a CALL CENTER Network. The Unified Mail Server performs the following functions:

1) Communicates with the Group Three Network resource called CALL CENTER to learn of new messages waiting for particular clients;
2) Sends and receives voice mail, fax, and email to third party mail servers (Exchange, POP3, SMTP, IMAP4); and
3) Stores results of sent messages by communicating to the DB Server.

Host Server (M)

The Host Server is a CALL CENTER resource. One Host Server can be shared amongst many companies/clients in a CALL CENTER Network. The Host Server performs the following functions:

1) Starts all of the resources on its local (physical) machine/host based on the network table which is loaded at startup;
2) Starts specific resources not started by Host Server at startup as specified by the Group One Application called Network Manager;
3) Creates directories and database entries peculiar to its physical machine/host for storing and retrieving voice files, greetings, and executables.

Scheduling Server (N)

The Scheduling Server is a CALL CENTER resource. One Scheduling Server can be shared among many companies/clients in a CALL CENTER Network. The Scheduling Server performs the following functions:

1) Keeps track and schedules time-of-day multimedia transaction routing rules so transactions can be routed to alternate menus, workgroups and agents;
2) Keeps track and schedules phone type entries on behalf of agents and users (IP Telephony versus Local Phones, etc.) based on time-of-day rules.

Chat Server (O)

The Chat Server is a CALL CENTER resource. One Chat Server is dedicated for each company defined as a client on the network. The purpose of the Chat Server is to:

1) Interface with Group Three Network Resource called Collaboration Server in order to find agents for Web-based chat requests;
2) Provide hard chat connection between Collaboration Server and agent after communicating with the ACD Server to identify available agent;
3) Maintain real-time connection between Collaboration Server and agent.

Group Three

Network Resources

CALL CENTER (P)

The CALL CENTER is a Group Three Network Resource. A CALL CENTER resource can be shared among many companies/clients in a CALL CENTER network. The purpose of the CALL CENTER is to:

1) Communicate with hardware specific and channel-specific devices to set up and tear down multimedia transactions;
2) Establish transaction routing and stay in the loop on all real-time transactions;
3) Execute Interactive Voice Response (IVR) touch-tone routing menus and automated attendant functions;
4) Make recordings on behalf of client applications and log the results to the database;
5) Route non-real-time messages such as voice mail, to the Group Two CALL CENTER Resource called the Unified Mail Server;
6) Set-up the hardware required to do conferencing and monitoring IN real time;
7) Support multi-node real-time switching across the network, and keep track of the connections with a state table loaded in memory.

Collaboration Server (Q)

The Collaboration Server is a Group Three Network Resource. A Collaboration Server resource is dedicated for each company defined as a client on the network. The purposes of the Collaboration Server are:

1) Interface with Group Four Network Endpoints, including the Web Servlet, to facilitate a direct interface between Web clients and agents;

2) Act as middleware that speaks to the Group Two CALL CENTER Resource called the ACD Server to find agents for Chat Requests;

3) Establish and maintain hard chat connections between agents and Web clients after communicating with the Group Two CALL CENTER Resource called the Chat Server to identify available agents;

4) Support other collaborative connections between users, including video sessions, application sharing, and form sharing.

E-Mail Distributor (R)

The E-Mail Distributor is a Group Three Network Resource. An E-Mail Distributor resource is dedicated for each company defined as a client on the network. The purposes of the Distributor are:

1) Retrieve emails from 3rd party email servers using POP3 or MAPI;

2) Communicate with the Group Two Call Center Resource called the ACD Server to find agents and users to distribute mail to;

3) Routes the email to the Group Two Call Center Resource called the Unified Mail Server in order to push mail to the agents' or users' mailbox;

4) Informs the Group One Application called the Interaction Manager (Agent Desktop Client Interface) of new incoming mail.

Group Four

Network Endpoints and Devices

Endpoint Devices (S)

Endpoint devices are Group Four elements of the CALL CENTER network. The most common devices in this class are telephone instruments, including these:

1) "2500 set" (i.e., Plain Old Telephone Service) compatible devices such as headsets, answering machines, simple multi-line telephones, and fax machines;

2) IP Telephony (Voice over the Internet) soft phones, such as Tundo, NetMeeting, VocalTec, etc., and screen-based soft phones;

3) IP Telephones that are hard devices with the appropriate protocol stacks in them to convert H.323 and other encoding schemes without the use of a multimedia PC;

4) Cellular Telephones and other hand-held devices, such as personal digital assistants and other screen-based wireless hand-held devices;

Web Servlet (T)

A Web Servlet is a Group Four Network Endpoint Device dedicated for each company defined as a client on the network. The purposes of the Web Servlet:

1) Act as a Web browsing client arbiter on behalf of IP, HTTP-based multimedia callers and associated transactions;

2) Maintain real-time collaborative connections between Web-based multimedia users and sessions maintained by CALL CENTER Network servers and processes.

Packet/Circuit/Hybrid Tandem Switches (U)

A tandem switch is a Group Four Network Device that is used as a shared resource in a CALL CENTER network. A tandem switch does not connect directly to endpoints, but is used as an intermediary between endpoints. Tandem switches connect to other switches, which in turn may have endpoints associated with them.

We have described various embodiments of the present invention solely for illustrative purposes, and not limitation. The breadth and scope of the invention are not limited by any of the above-described exemplary embodiments and features, but are defined solely in accordance with the following claims and their equivalents.

What is claimed:

1. A multi-channel multi-media telecommunications call center system, comprising:
   a call center infrastructure shared by a first company and a second company and providing hosted call center services to the first company and the second company;
   a first application dedicated to said first company;
   a second application dedicated to said second company, wherein the first or second application is selected from the group consisting of: a mail manager, a network manager, an interaction manager, an administration manager, a supervision manager, and a combination thereof;
   a call center resource shared by said first and second companies, wherein said call center resource is selected from the group consisting of a stats server, a database server, a resource manager, a unified mail server, a host server, a scheduling server, and a combination thereof wherein said database server broadcasts, in real time, to call center resources and network resources changes, wherein said resource manager maintains a list of resources, maintains a list of first company agents, informs the resources of availability of new resources, informs the resources of shutdown of resources, and provides alternate connections when existing connections are interrupted by resource shutdowns, wherein said unified mail server sends outgoing messages to third party servers and receives incoming messages from the third party servers, and communicates results of sent outgoing messages to the database server, wherein said host servers loads a network table describing correspondences between the resources and physical hosts of the telecommunications system that can execute the resources, starts each resource on a physical host in accordance with the network table, starts stopped resources and the resources added by the network manager, and provides a communication service to the network manager to enable the network manager to communicate with network elements, and wherein said scheduling server varies transaction routing rules in accordance with time of day, thereby allowing similar messages initiating transactions to be routed to different destinations depending on time of day; and
   a network resource shared by said first and second companies, wherein said call center resource and said network resource are implemented within said call center infrastructure.

2. The system of claim 1, wherein said network manager enables said first or second company to add, remove, modify, start, or stop a resource in said system in real-time.

3. The system of claim 1, wherein said administration manager
   creates a first company data structure for said first company and defines parameters stored in the first company data structure, creates first company agent data structures for a plurality of agents associated with the first company and defines first company agent attributes stored in each first company agent data structure, the agent attributes include agent skills, creates a first company supervisor data structure for a first supervisor associated with the first company and defines first company supervisor attributes stored in the first company supervisor data structure, the first company supervisor attributes include supervisor skills and capabilities, and creates and defines a process for routing to the first company agents of incoming messages received from a telecommunications network and directed to the first company, and of outgoing messages from the first company over the telecommunications network.

4. The system of claim 1, wherein said network resource comprises a call center server that determines transaction routing, communicates with hardware-specific and channel-specific devices to setup and tear down transactions, and monitors real time transactions.

5. The system of claim 1, wherein said call center resource and said network resource belong to a first subset of resources capable of operating in a master mode and a mirror mode, the master and mirror mode operations of said resource of the first subset having identical internal states and identical state transitions, wherein if each resource of the first subset operating in the mirror mode receives real time copies of communications sent to its corresponding master resource, each resource of the first subset operating in the mirror mode not duplicating transmissions of its corresponding master resource, each resource of the first subset operating in the mirror mode changing its mode to master mode upon detection of non-operation of its corresponding master resource;

each resource registers on startup with the resource manager by identifying a mode of said each resource, a type of said each resource, a host identifier of the host on which said each resource is executing, and a list of resources needed by said each resource;

the resource manager notifies online resources that said each resource came online, after said each resource registers and comes online; and if a notified online resource needs said each registered resource, the notified online resource establishes a communications link with said each registered resource.

6. The system of claim 1, further comprising:

a host server, a network database from which the network manager loads network descriptors of the telecommunications system and to which the network manager stores the network descriptors, the network descriptors include configuration data for resources and communication channel specifiers, and the first company data structure;

wherein:

the network manager starts and stops the resources by instructing the host server to start and stop the resources;

the network manager provides a management interface facility that allows a network managing user to stop the resources, to provide the configuration data for the resources, to start the resources, to display topology of the telecommunications system, to display connections between servers of the multi-channel multi-media telecommunications system, to monitor network activity and alarms, to change modes of the resources of the first subset, and to display parameters and status information of the resources;

said each resource on startup obtains its associated startup parameters from the network database;

the host server obtains resource status information from the resources and sends the resource status information to the network manager;

the host server starts and stops the resources without disrupting existing transactions and initiation of new transactions.

7. The system of claim 6, further comprising a load balancer, wherein the load balancer observes requests for resources and causes the host server to start additional resources of a first type when received requests for resources of the first type exceed a first type threshold.

8. The system of claim 1, wherein:

the messages include facsimile transmissions, live voice messages, voice mail, email, and web-based messages;

the transactions include web chats, form sharing, conference transactions, live telephone communications, transmission and receipt of facsimiles, transmission and receipt of email, and receipt of voice messages;

the unified mail server sends results of the outgoing messages to the database server for storage and communicates with the call center server to receive notification of presence of messages awaiting transmission to third party correspondents and the first company agents;

the mail manager receives message status information from the unified mail server, recovery of abnormal messages, the abnormal messages including undeliverable and corrupted messages, notification of the network managing user through the management interface facility of the existence of abnormal messages, and enables the network managing user to re-direct the abnormal messages;

the interaction manager sets up and tears down conference transactions, records transactions and provides the network managing user with access to transaction records through the management interface facility, and creates trouble tickets for troubleshooting and correcting errors; and the supervision manager allows a first supervisor at a first location to obtain real time reports of first command agents statistics and telecommunications system usage to monitor first company transactions, including remote screen and remote audio monitoring, to record first company agent activities, to send instant messages to the first company agents, to replace monitored first company agents in the course of the first company monitored transactions, to close down the first company monitored transactions, and to log-off a first company agent selected for log-off from the multi-channel multi-media telecommunications systems.

9. The system of claim 8, further comprising:

a first collaboration server for finding first company agents with chat and form sharing capabilities, maintaining hard chat connections between web-based customers and the first company agents with chat and form sharing capabilities, finding first company agents with video capabilities, and maintaining video connections between customers with video capabilities and the first company agents with video capabilities;

a first email distributor for retrieving email from the third party servers, communicating with a first ACD server to find first company agents available for receipt of the email retrieved by the first email distributor, routing the email retrieved by the first email distributor to the unified mail server, and informing the interaction manager of the existence of the email retrieved by the first email distributor;

a statistical server for saving the first company agents' log-in information, the status of the first company agents, and outcomes of the transactions, and for sending to the supervision manager the telecommunications center statistics, the multi-channel multi-media telecommunications system center statistics including the status of the first company agents, traffic statistics, and queue statistics, the queue statistics being a measure of waiting time for processing of at least some transactions; and a chat server for communicating with the first collaboration server and the first ACD server to find available first company agents with chat and form sharing capabilities to handle chat transactions, providing hard chat connections between the available first company agents with chat and form sharing capabilities and the first collaboration server, and maintaining real time connections between the first collaboration server and the available first company agents with chat and form sharing capabilities.

10. The system of claim 3, further comprising endpoint devices for use by the first company agents, the endpoint devices including telephones and a web servlet associated with the first company to enable the first company agents to communicate with web-based customers, wherein the network manager allows dynamic real time adding, removing, or modifying the endpoint devices.

11. The system of claim 3, further comprising an access limiter for limiting the first company's use of the multi-channel multi-media telecommunications systems; wherein the type of the received message directed to the first company includes origination information and destination information of the received message directed to the first company.

\* \* \* \* \*

UNITED STATES PATENT AND TRADEMARK OFFICE
CERTIFICATE OF CORRECTION

PATENT NO. : 7,568,038 B1
APPLICATION NO. : 10/739916
DATED : July 28, 2009
INVENTOR(S) : Ran Ezerzer et al.

It is certified that error appears in the above-identified patent and that said Letters Patent is hereby corrected as shown below:

On sheet 1 of 34, in Figure 1, line 1, delete "Mobil" and insert -- Mobile --, therefor.

On sheet 30 of 34, in Figure 30, line 12, delete " (Y) " and insert -- (Y) --, therefor.

In column 2, line 35, delete "PrivateBranch" and insert -- Private Branch --, therefor.

In column 2, line 29, delete "internet-Type" and insert -- Internet-Type --, therefor.

In column 4, line 31, delete "EnterpriseLevel" and insert -- Enterprise Level --, therefor.

In column 7, line 37, delete "DSTN" and insert -- PSTN --, therefor.

In column 7, line 56, delete "DMIP2431A-T1" and insert -- DMIP2431A-T-1 --, therefor.

In column 8, line 12, delete "DMIP2431A-TI" and insert -- DMIP2431A-T-1 --, therefor.

In column 8, line 18, delete "DMIP2431A-T1," and insert -- DMIP2431A-T-1, --, therefor.

In column 9, line 65, delete "A" and insert -- a --, therefor.

In column 12, line 17, delete "offhook" and insert -- off-hook --, therefor.

In column 14, line 33, delete "wits" and insert -- with --, therefor.

In column 16, line 66, delete "Access Record" and insert -- Record Access --, therefor.

In column 19, line 29, delete "clientside" and insert -- client-side --, therefor.

In column 19, line 45, delete "screens" and insert -- screens; --, therefor.

In column 20, line 32, delete "outcomes," and insert -- outcomes --, therefor.

Signed and Sealed this

Thirteenth Day of July, 2010

David J. Kappos
*Director of the United States Patent and Trademark Office*